(12) United States Patent
Park et al.

(10) Patent No.: US 12,069,613 B2
(45) Date of Patent: Aug. 20, 2024

(54) TRANSMIT BEAM SELECTION SCHEMES FOR MULTIPLE TRANSMISSION RECEPTION POINTS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/321,871

(22) Filed: May 17, 2021

(65) Prior Publication Data

US 2021/0377914 A1 Dec. 2, 2021

Related U.S. Application Data

(60) Provisional application No. 63/033,165, filed on Jun. 1, 2020.

(51) Int. Cl.
*H04W 72/02* (2009.01)
*H04W 8/24* (2009.01)
*H04W 72/044* (2023.01)
*H04W 72/23* (2023.01)
*H04W 72/566* (2023.01)

(52) U.S. Cl.
CPC ............ *H04W 72/02* (2013.01); *H04W 8/24* (2013.01); *H04W 72/046* (2013.01); *H04W 72/23* (2023.01); *H04W 72/569* (2023.01)

(58) Field of Classification Search
CPC .............. H04W 72/02; H04W 72/046; H04W 72/1242; H04W 72/1289; H04W 8/24; H04B 7/024
See application file for complete search history.

(56) References Cited

U.S. PATENT DOCUMENTS

| | | | |
|---|---|---|---|
| 2015/0141063 A1* | 5/2015 | Lawless | H04W 4/18 455/466 |
| 2020/0077369 A1 | 3/2020 | Zhang et al. | |
| 2020/0221428 A1* | 7/2020 | Moon | H04B 7/024 |

(Continued)

OTHER PUBLICATIONS

International Search Report and Written Opinion—PCT/US2021/033029—ISA/EPO—Aug. 30, 2021.

(Continued)

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may prioritize a transmission scheme for a transmission configuration indication (TCI) state for receiving a downlink message from one or more transmission reception points (TRPs). The UE may receive a downlink control message via a first carrier that schedules a downlink signal for the UE via a second carrier. The UE may select one or more TCI states for reception of the downlink signal based at least in part on the prioritization of the first transmission scheme. The UE may receive the downlink signal via the second carrier in accordance with the selected one or more TCI states.

21 Claims, 23 Drawing Sheets

(56) References Cited

U.S. PATENT DOCUMENTS

2020/0389897 A1* 12/2020 Mondal .................... H04L 1/08
2022/0104237 A1* 3/2022 Muruganathan ...... H04L 5/0035

OTHER PUBLICATIONS

NTT DOCOMO Inc: "Enhancements on Multi-TRP/Panel Transmission", 3GPP Draft, 3GPP TSG RAN WG1 #98bis, R1-1911184, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808317,32 Pages, Retrieved from the Internet: URL: https://ftp.3gpp.org/tsg_ran/WG1_RL1/TSGR1_98b/Docs/R1-1911184.zip R1-1911184.docx [retrieved on Oct. 4, 2019] Multiple PDCCH based Multi-TRP/Panel Transmission; p. 5, paragraph 2.2-p. 7 PDCCH enhancement; p. 7, paragraph 2.2.1-p. 8; figures 2-6, pp. 11-13, Section 1, Section 2.1.1, Section 2.2.1, figures 2-1, 2-4, the whole document.

NTT DOCOMO Inc: "Enhancements on Multi-TRP/Panel Transmission," 3GPP Draft, 3GPP TSG RAN WG1 #99, R1-1912893, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 18, 2019-Nov. 22, 2019, Nov. 8, 2019 (Nov. 8, 2019), XP051820229, 21 pages, Retrieved from the Internet: URL: https://ftp.3gpp.org/tsg_ran/WG1_RL1/TSGR1_99/Docs/R1-1912893.zip R1-1912893.docx [retrieved on Nov. 8, 2019] section 2.1.1, section 2.2.3, Figs 2-1, 2-2, section 2.1 page, p. 2. Proposal 2-1, page, 2 section 2.1.1, section 2.1.2, Fig. 2-5.

* cited by examiner

TRANSMIT BEAM SELECTION SCHEMES FOR MULTIPLE TRANSMISSION RECEPTION POINTS

CROSS REFERENCE

The present Application for Patent claims the benefit of U.S. Provisional Patent Application No. 63/033,165 by Park et al., entitled "TRANSMIT BEAM SELECTION SCHEMES FOR MULTIPLE TRANSMISSION RECEPTION POINTS," filed Jun. 1, 2020, assigned to the assignee hereof, and expressly incorporated by reference herein.

FIELD OF TECHNOLOGY

The following relates generally to wireless communications and more specifically to transmit beam selection schemes for multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may use a default transmit beam if the physical downlink control channel (PDCCH)-to-physical downlink share channel (PDSCH) delay or the PDCCH-to-Aperiodic-Channel State Information Reference signal (A-CSI-RS) delay is less than the beam switching timing threshold. In some cases, the length of the beam switching timing threshold may depend on whether same-carrier scheduling or cross-carrier scheduling is used, or may depend on whether a single-TRP, multi-TRP, or single frequency network (SFN) is used. In such cases, as beam switching timing threshold changes depending on various factors, it may be ambiguous as to which default transmit beam or beams are used.

SUMMARY

The described techniques relate to improved methods, systems, devices, and apparatuses that support transmit beam selection schemes for multiple transmission reception points (TRPs). Generally, the described techniques enable a user equipment (UE) and a TRP to determine which transmit beam(s) to use for downlink signal transmissions to the UE from one or more TRPs. For example, if a delay between a shared channel or reference signal and the control message scheduling the shared channel or reference signal is within a beam switching timing interval (e.g., less than the beam switching timing threshold), the UE may use a default quasi co-located (QCL) rule to determine which transmission configuration indication (TCI) state to use for receiving the downlink signal. The TCI state(s) used may indicate which transmit beams are utilized by the one or more TRPs for transmission of the downlink signal.

In some examples, determining a default beam may depend on the transmission scheme being used by the UE and whether the control information (e.g., downlink control information (DCI) carried by a physical downlink control channel (PDCCH)) configures same-carrier scheduling or cross-carrier scheduling, or whether the transmission scheme indicates a single-TRP or a multi-TRP transmission scheme.

In some cases, one or more rules may be followed when selecting a default transmit beam. For example, in the case of a same-carrier scheduling with a single-TRP scheme, the UE may follow the QCL assumption of the lowest control resource set (CORESET) identifier (ID) monitored in the latest slot. In the case of a cross-carrier scheduling case with a single-TRP scheme, the UE may follow the QCL assumption of the lowest TCI state ID among the activated TCI states. This rule may be followed independent of whether the DCI scheduling the downlink message indicates a single-TRP or a multi-TRP scheme, or whether a single frequency network (SFN) is indicated.

A method of wireless communications at a UE is described. The method may include prioritizing a first transmission scheme among a set of transmission schemes to use for a TCI determination, and receiving, from a first TRP of multiple TRPs and via a first carrier, a downlink control message that schedules a downlink signal for the UE via a second carrier. The method may further include selecting one or more TCI states of a set of TCI states for reception of the downlink signal based on the prioritization of the first transmission scheme and receiving the downlink signal via the second carrier in accordance with the selected one or more TCI states.

An apparatus for wireless communications at a UE is described. The apparatus may include a processor, memory coupled with the processor, and instructions stored in the memory. The instructions may be executable by the processor to cause the apparatus to prioritize a first transmission scheme among a set of transmission schemes to use for a TCI determination and receive, from a first TRP of multiple TRPs and via a first carrier, a downlink control message that schedules a downlink signal for the UE via a second carrier. The apparatus may include further instructions executable by the processor to select one or more TCI states of a set of TCI states for reception of the downlink signal based on the prioritization of the first transmission scheme and receive the downlink signal via the second carrier in accordance with the selected one or more TCI states.

Another apparatus for wireless communications at a UE is described. The apparatus may include means for prioritizing a first transmission scheme among a set of transmission schemes to use for a TCI determination and means for receiving, from a first TRP of multiple TRPs and via a first carrier, a downlink control message that schedules a downlink signal for the UE via a second carrier. The apparatus may further include means for selecting one or more TCI states of a set of TCI states for reception of the downlink signal based on the prioritization of the first transmission scheme and means for receiving the downlink signal via the second carrier in accordance with the selected one or more TCI states.

A non-transitory computer-readable medium storing code for wireless communications at a UE is described. The code may include instructions executable by a processor to prioritize a first transmission scheme among a set of transmission schemes to use for a TCI determination and receive, from a first TRP of multiple TRPs and via a first carrier, a downlink control message that schedules a downlink signal for the UE via a second carrier. The code may include instructions executable by the processor to select one or more TCI states of a set of TCI states for reception of the downlink signal based on the prioritization of the first transmission scheme and receive the downlink signal via the second carrier in accordance with the selected one or more TCI states.

Some examples of the method, apparatuses, and non-transitory computer-readable medium described herein may further include operations, features, means, or instructions for selecting the one or more TCI states independent of a second transmission scheme indicated by the downlink control message.

Some examples of the method, apparatuses, and non-transitory computer-readable medium described herein may further include operations, features, means, or instructions for identifying a set of TCI codepoints corresponding to the set of TCI states, determining a codepoint of the set of TCI codepoints corresponding to a lowest codepoint that may be associated with multiple TCI states, and selecting the one or more TCI states based on the codepoint.

Some examples of the method, apparatuses, and non-transitory computer-readable medium described herein may further include operations, features, means, or instructions for identifying a set of TCI codepoints corresponding to the set of TCI states, determining a codepoint of the set of TCI codepoints corresponding to a lowest codepoint that may be associated with a single TCI state, and selecting the one or more TCI states based on the codepoint.

Some examples of the method, apparatuses, and non-transitory computer-readable medium described herein may further include operations, features, means, or instructions for determining quasi-colocation information for the downlink signal based on the downlink control message, and selecting the one or more TCI states as a default TCI state based on the quasi-colocation information.

Some examples of the method, apparatuses, and non-transitory computer-readable medium described herein may further include operations, features, means, or instructions for transmitting an indication of the prioritized first transmission scheme to the first TRP, where the downlink signal may be received based on the indication.

In some examples of the method, apparatuses, and non-transitory computer-readable medium described herein, transmitting the indication may include operations, features, means, or instructions for transmitting a UE capability report or UE assistance information indicating priority of the first transmission scheme over other transmission schemes of the set of transmission schemes.

In some examples of the method, apparatuses, and non-transitory computer-readable medium described herein, transmitting the indication may include operations, features, means, or instructions for transmitting a UE capability report or UE assistance information indicating respective priority levels for each of the set of transmission schemes.

Some examples of the method, apparatuses, and non-transitory computer-readable medium described herein may further include operations, features, means, or instructions for determining one or more transmit beams used for transmission of the downlink signal based on the selected one or more TCI states, and receiving the downlink signal based on the one or more transmit beams.

Some examples of the method, apparatuses, and non-transitory computer-readable medium described herein may further include operations, features, means, or instructions for determining a beam switch timing interval based on a second transmission scheme indicated by the downlink control message, where the one or more TCI states may be selected based on the beam switch timing interval.

In some examples of the method, apparatuses, and non-transitory computer-readable medium described herein, selecting the one or more TCI states may include operations, features, means, or instructions for determining default quasi-colocation information corresponding to the selected one or more TCI states based on the downlink signal being scheduled within the beam switch timing interval.

In some examples of the method, apparatuses, and non-transitory computer-readable medium described herein, selecting the one or more TCI states may include operations, features, means, or instructions for determining quasi-colocation information corresponding to the selected one or more TCI states based on the downlink control message.

Some examples of the method, apparatuses, and non-transitory computer-readable medium described herein may further include operations, features, means, or instructions for determining the first transmission scheme to be a cross carrier scheme based on the second carrier being different than the first carrier.

Some examples of the method, apparatuses, and non-transitory computer-readable medium described herein may further include operations, features, means, or instructions for determining the first transmission scheme to be a same carrier scheme based on the second carrier being the same as the first carrier.

Some examples of the method, apparatuses, and non-transitory computer-readable medium described herein may further include operations, features, means, or instructions for determining the first transmission scheme to be a single TRP scheme based on the downlink signal being scheduled for transmission by the first TRP.

Some examples of the method, apparatuses, and non-transitory computer-readable medium described herein may further include operations, features, means, or instructions for determining the first transmission scheme to be a multiple TRP scheme based on the downlink signal being scheduled for transmission by a second TRP of the multiple TRPs.

A method of wireless communications at a TRP is described. The method may include receiving, from a UE, an indication of a first transmission scheme that is prioritized among a set of transmission schemes supported by the UE, selecting one or more TCI states of a set of TCI states a downlink signal for the UE based on the first transmission scheme, and transmitting, to the UE and via a first carrier, a downlink control message that schedules the downlink signal for the UE via a second carrier based on the selected one or more TCI states.

An apparatus for wireless communications at a TRP is described. The apparatus may include a processor, memory coupled with the processor, and instructions stored in the memory. The instructions may be executable by the processor to cause the apparatus to receive, from a UE, an indication of a first transmission scheme that is prioritized among a set of transmission schemes supported by the UE, select one or more TCI states of a set of TCI states a downlink signal for the UE based on the first transmission scheme, and transmit, to the UE and via a first carrier, a downlink control message that schedules the downlink signal for the UE via a second carrier based on the selected one or more TCI states.

Another apparatus for wireless communications at a TRP is described. The apparatus may include means for receiving, from a UE, an indication of a first transmission scheme that is prioritized among a set of transmission schemes supported by the UE, selecting one or more TCI states of a set of TCI states a downlink signal for the UE based on the first transmission scheme, and transmitting, to the UE and via a first carrier, a downlink control message that schedules the downlink signal for the UE via a second carrier based on the selected one or more TCI states.

A non-transitory computer-readable medium storing code for wireless communications at a TRP is described. The code may include instructions executable by a processor to receive, from a UE, an indication of a first transmission scheme that is prioritized among a set of transmission schemes supported by the UE, select one or more TCI states of a set of TCI states a downlink signal for the UE based on the first transmission scheme, and transmit, to the UE and via a first carrier, a downlink control message that schedules the downlink signal for the UE via a second carrier based on the selected one or more TCI states.

In some examples of the method, apparatuses, and non-transitory computer-readable medium described herein, receiving the indication of the first transmission scheme may include operations, features, means, or instructions for receiving a UE capability report or UE assistance information indicating priority of the first transmission scheme over other transmission schemes of the set of transmission schemes.

In some examples of the method, apparatuses, and non-transitory computer-readable medium described herein, receiving the indication of the first transmission scheme may include operations, features, means, or instructions for receiving a UE capability report or UE assistance information indicating respective priority levels for each of the set of transmission schemes.

Some examples of the method, apparatuses, and non-transitory computer-readable medium described herein may further include operations, features, means, or instructions for determining one or more transmit beams used for transmission of the downlink signal based on the selected one or more TCI states, and transmitting the downlink signal based on the one or more transmit beams.

Some examples of the method, apparatuses, and non-transitory computer-readable medium described herein may further include operations, features, means, or instructions for determining a beam switch timing interval based on the downlink control message, where the one or more TCI states may be selected based on the beam switch timing interval.

Some examples of the method, apparatuses, and non-transitory computer-readable medium described herein may further include operations, features, means, or instructions for transmitting quasi-colocation information in the downlink control message to the UE.

DETAILED DESCRIPTION

Figure 1:
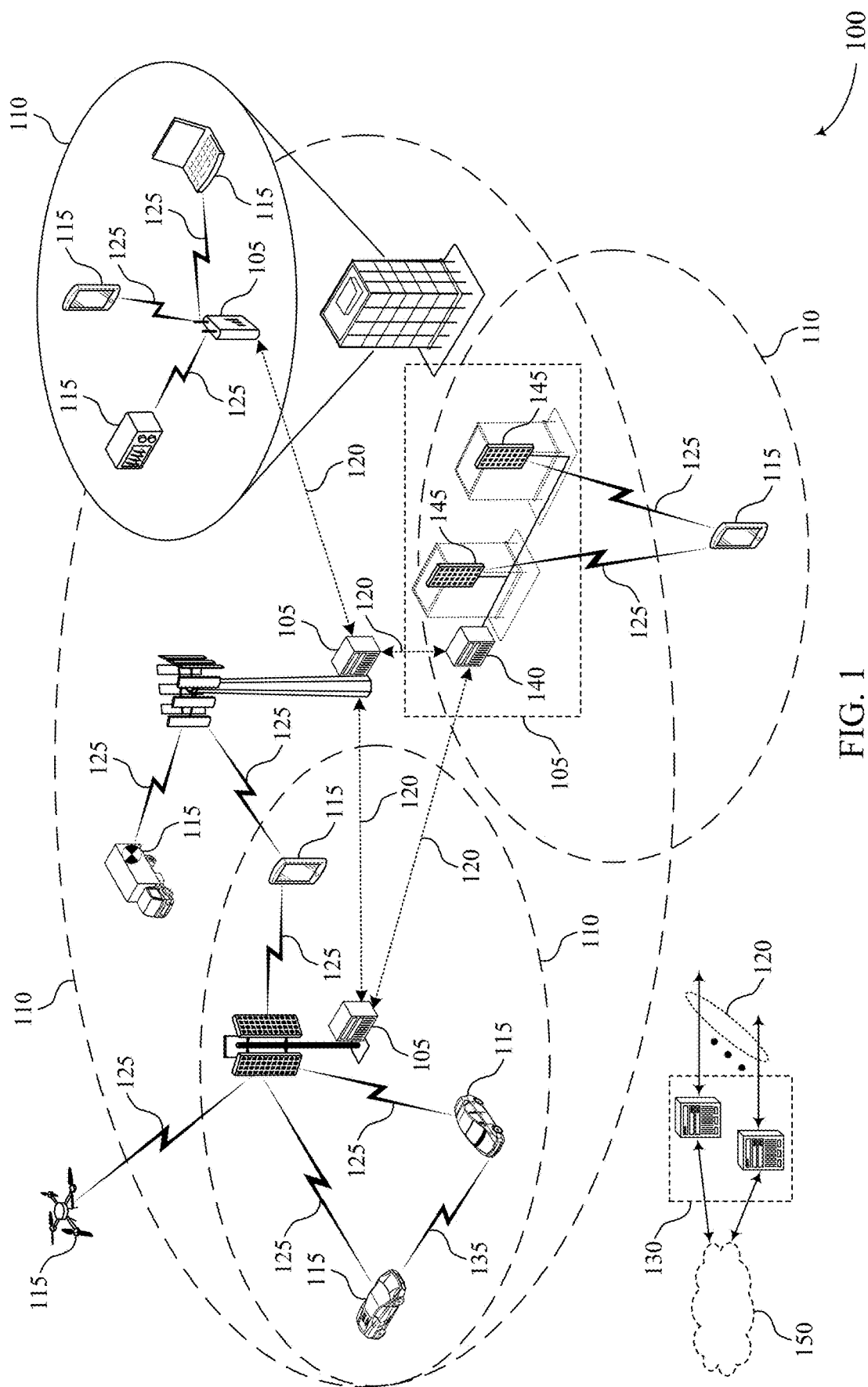
FIG. 1 illustrates an example of a wireless communications system that supports transmit beam selection schemes for multiple transmission reception points (TRPs) in accordance with aspects of the present disclosure.

Some wireless communications systems (e.g., a new radio (NR) system) may support cross-carrier scheduling in addition to single-carrier scheduling. In such examples, a base station may transmit a downlink grant on a first component carrier (CC) (e.g., a scheduling CC). The downlink grant may be included in a physical downlink control channel (PDCCH) on the scheduling CC. The downlink grant may indicate a set of physical downlink shared channel (PDSCH) resources for receiving a data transmission on a scheduled CC (e.g., a second CC that is different from the first CC). Additionally, or alternatively, the downlink grant may also indicate a set of resources for an aperiodic channel state information reference signal (A-CSI-RS) to estimate the channel and report channel quality information.

In some examples, a user equipment (UE) may process the PDCCH that includes the downlink grant, and the processing may take a minimum amount of time (e.g., a processing delay). In some cases, the scheduling CC may have a different numerology than the scheduled CC. For instance, the scheduling CC may have a different subcarrier spacing (SCS) than the scheduled CC, or the scheduling CC may have a different transmission time interval (TTI) than the scheduled CC, or both.

In some cases, a beam switching timing threshold may be implemented for cross carrier scheduling. The beam switching timing threshold may be the minimum number of orthogonal frequency-division modulation (OFDM) symbols for the UE to switch beams between PDCCH reception and an allocated PDSCH or a A-CSI-RS resource. The beam switching timing threshold may be included in the UE capability report. The beam switching timing threshold may be the timeDurationForQCL for PDSCH or beamSwitchTiming for A-CSI-RS. The beam switching timing may be defined in units of PDSCH or A-CSI-RS symbols.

If PDCCH SCS is less than the PDSCH or A-CSI-RS SCS, an additional beam switching timing threshold delay (d) may be added to the timeDurationForQCL or beamSwitchTiming for cross-carrier scheduling or triggering with different SCS. The same value for d may be used for both PDSCH scheduling and A-CSI-RS triggering. The d may be defined in units of PDCCH symbols.

In some examples, the PDCCH-to-PDSCH delay or the PDCCH-to-A-CSI-RS delay may be less than the beam switching timing threshold. In such instances, the UE may not have time to switch beams between a PDCCH and a PDSCH or A-CSI-RS. In these cases, the UE may use a default quasi co-located (QCL) rule, which may include a default transmit beam.

In some examples, determining a default beam may depend on the transmission scheme being used by the UE and if the downlink control information (DCI) in the PDCCH configures same-carrier scheduling or cross-carrier scheduling. In some examples, a UE may use a single-TRP or a multi-TRP transmission scheme.

In some cases, when a single-TRP transmission scheme is used, a single default transmit beam may be specified. In the case of a same-carrier scheduling with a single-TRP scheme, the UE may follow the QCL assumption of the lowest control resource set (CORESET) ID monitored in the latest slot. In the case of a cross-carrier scheduling case with a single-TRP scheme, the UE may follow the QCL assumption of the lowest transmission configuration indication (TCI) state ID among the activated TCI states.

In some cases, when a UE is using a multi-TRP transmission scheme, two default transmit beams may be specified. In some cases, the UE may receive a single DCI. For the default transmit beams in a single DCI case, the UE may follow the QCL assumption of the TCI states corresponding to the lowest TCI codepoint that contains two TCI states. In some cases, the UE may receive multiple DCIs. For the default transmit beams in a multi-DCI case, the UE may follow the QCL assumptions of the lowest CORESET ID within each CORESETPoolIndex in the latest slot.

In some examples, the beam switching timing threshold may depend on whether the same-carrier scheduling/triggering or cross-carrier scheduling/triggering is used. For the case of same-carrier scheduling/triggering, the beam switching timing threshold is timeDurationForQCL for PDSCH or beamSwitchTiming for A-CSI-RS. For the case of cross-carrier scheduling/triggering, the beam switching timing threshold is timeDurationForQCL+d for PDSCH or beamSwitchTiming+d for A-CSI-RS.

In some examples, the value of d may depend on the transmission scheme, such as but not limited to a single-TRP, a multi-TRP, or a single frequency network (SFN). Additionally, or alternatively, the value of d may depend on if same-carrier scheduling/triggering or multi-carrier scheduling/triggering is being used. In some examples, when beam switching timing threshold changes depending on the transmission scheme, it may be ambiguous which default transmit beam or beams to use.

In some examples, if a UE supports different transmission schemes, such as single-TRP, SFN, or multi-TRP, the UE may determine and indicate which transmission scheme will be used for default beams. In some cases, a UE may indicate which transmission scheme will be used for default beams by indicating a priority. In some cases, the priority may indicate a preferred transmission scheme from the set of different transmission schemes that the UE support. In some cases, a UE may indicate a priority preference in a UE capability report or a UE assistance information. In some cases, the priority may be predetermined in the specification. In some cases, the priority may be determined based on parameters of the UE, parameters of one or more base stations, or any combination thereof.

In some cases, a default QCL may also be determined based on the determined priority. In the same-carrier scheduling case, if multiple CORESETs are configured with different transmission schemes in the latest slot, the default QCL may be selected based on the determined priority. In the cross-carrier scheduling case, if multiple TCI codepoints are activated with different transmission schemes, the default QCL may be selected based on the determined priority.

In some cases, a default QCL may be determined based on the determined priority. In the same-carrier scheduling case, if multiple CORESETs are configured with different transmission schemes in the latest slot, the default QCL may be selected based on the determined priority. In the cross-carrier scheduling case, if multiple TCI codepoints are activated with different transmission schemes, the default QCL may be selected based on the determined priority.

Aspects of the disclosure are initially described in the context of a wireless communications system. Aspects of the disclosure are further illustrated by and described with reference data transmission schemes and process flow diagrams. Aspects of the disclosure are further illustrated by and described with reference to apparatus diagrams, system diagrams, and flowcharts that relate to transmit beam selection schemes for multiple TRPs.

FIG. 1 illustrates an example of a wireless communications system 100 that supports transmit beam selection schemes for multiple TRPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station

105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples, (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may determine and indicate a priority among transmission schemes to determine a TCI state for receiving a downlink message. For example, a UE 115 may determine QCL information such as a default QCL that indicates a TCI state for the UE 115 for reception of a downlink message from a base station 105. The default QCL may indicate a default transmit beam or beams used by the base station 105 for transmission of a downlink message. For example, a UE 115 may indicate a priority preference in a UE capability report or a UE assistance information. In some cases, the priority may be preconfigured at the UE 115 or defined in accordance with a set of standards. In some cases, the priority may be determined based on parameters of the UE 115, parameters of one or more base stations 105, which may be referred to as TRPs, or any combination thereof. A default QCL may also be selected based on the determined priority.

Figure 2:
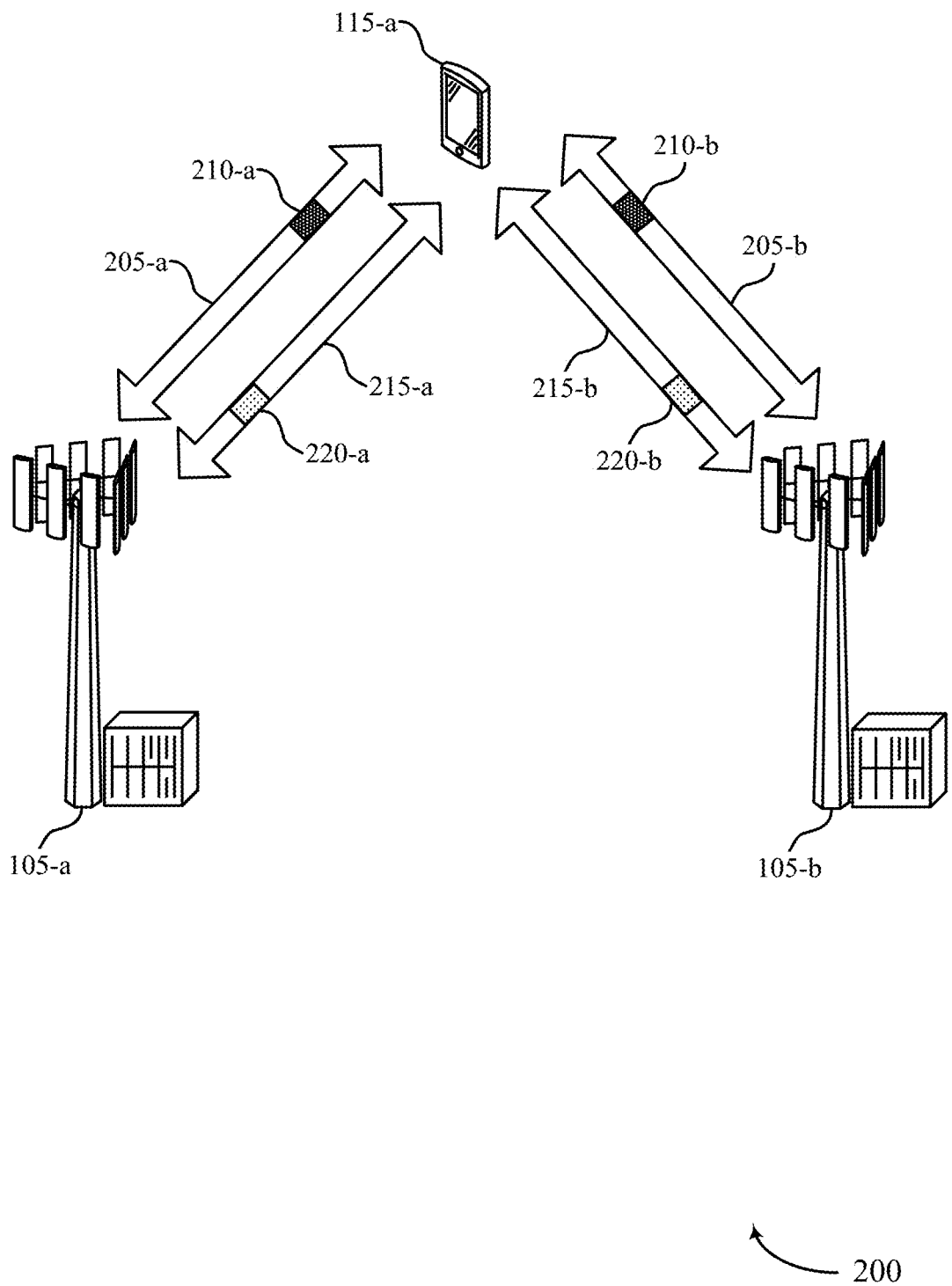
FIG. 2 illustrates an example of a wireless communications system that supports transmit beam selection schemes for multiple TRPs in accordance with aspects of the present disclosure.

FIG. 2 illustrates an example of a wireless communications system 200 that supports transmit beam selection schemes for multiple TRPs in accordance with aspects of the present disclosure. In some examples, wireless communications system 200 may implement aspects of wireless communications system 100. Wireless communications system 200 may include a first base station 105-*a* (e.g., a first TRP), a second base station 105-*b* (e.g., a second TRP), and a UE 115-*a*, which may be examples of corresponding base stations 105 and UEs 115, respectively, as described herein with reference to FIG. 1. In some cases, base station 105-*a* and base station 105-*b* may be two TRPs associated with a same base station 105, or different panels of a same base station 105, or different beams associated with a same base station 105, etc. Accordingly, UE 115-*a* may support communicating with both base station 105-*a* and base station 105-*b* simultaneously.

In some examples, base station 105-*a*, base station 105-*b* and UE 115-*a* may support cross-carrier scheduling. UE 115-*a* may receive from base station 105-*a* downlink grant 210-*a* and data transmission 220-*a* across different CCs. In such examples, base station 105-*a* may transmit a downlink grant 210-*a* on a scheduling CC 205-*a*. The downlink grant 210-*a* may be included in a PDCCH on scheduling CC 205-*a*. The downlink grant may indicate a set of PDSCH resources for receiving a data transmission 220-*a* on a scheduled CC 215-*a*.

In some examples, UE 115-*a* may communicate with a single base station 105, such as base station 105-*a*. This may be referred to as a single-TRP scheme. In some other examples, UE 115-*a* may be communicating with multiple base stations 105, such as base station 105-*a* and base station 105-*b*. This may be referred to as a multi-TRP scheme.

As shown, UE 115-*a* may receive a first downlink grant 210-*a* transmitted from base station 105-*a* that schedules a first data transmission 220-*a* also transmitted from base station 105-*a* and may receive a second downlink grant 210-*b* transmitted from base station 105-*b* that schedules a second data transmission 220-*b* also transmitted from base station 105-*b*. In another example, UE 115-*a* may receive a first downlink grant 210-a transmitted from base station 105-a that schedules the second data transmission 220-b from base station 105-b.

In some examples, the first data transmission 220-a may also be scheduled with a beam switching timing threshold between the PDCCH containing the downlink grant 210-a and the first data transmission 220-a. The beam switching timing threshold may be based on the UE 115-a specific capabilities and may be the minimum number of OFDM symbols required by the UE to switch beams between PDCCH reception and PDSCH or A-CSI-RS reception or transmission. UE 115-a may communicate the beam switching timing threshold to base station 105-a and base station 105-b in the UE capability report.

If the SCS of the scheduling CC 205-a is less than the SCS of the scheduled CC 215-a, then an additional delay d may be added to the beam switching timing threshold for cross-carrier scheduling/triggering with different SCS.

In some examples, UE 115-a may take additional time to switch beams between downlink grant 210-a reception and the data transmission 220-a when operating in a multi-TRP scheme than when operating in a single-TRP scheme. To compensate for the additional beam switching time in the multi-TRP scheme, a different value of d may be used for different transmission schemes and scheduling schemes. The value d may depend on if the data transmission 220-a is configured for cross-carrier scheduling/triggering or same-carrier scheduling/triggering. The value of d may also depend on if the UE is operating in a multi-TRP scheme.

The values for d may also depend on the specific configured multi-TRP scheme such as time division multiplexing, frequency division multiplexing, and space division multiplexing. The values for d may also depend on if a single frequency network scheme is configured.

In some cases, the time between the downlink grant 210-a and data transmission 220-a may be less than the beam switching timing threshold plus d. In this case, UE 115-a may not have enough time to switch beams for data transmission 220-a. In some cases, UE 115-a may use a default QCL rule. In some cases, UE 115-a may use a default transmit beam instead of the transmission configuration in downlink grant 210-a.

UE 115-a may determine which transmission scheme will be used for default transmit beams. UE 115-a may indicate to base station 105-a and/or base station 105-b which transmission scheme will be used for default beams. In some cases, UE 115-a may indicate which transmission scheme will be used for default beams by indicating a priority. In some cases, the priority may indicate a preferred transmission scheme from the set of different transmission schemes that UE 115-a supports. In some cases, UE 115-a may indicate a priority preference to base station 105-a and/or base station 105-b in a UE capability report or a UE assistance information. In some cases, the priority for UE 115-a may be predetermined in a specification. The specification may define a set of priority rules based at least on UE 115-a parameters.

Figure 3:
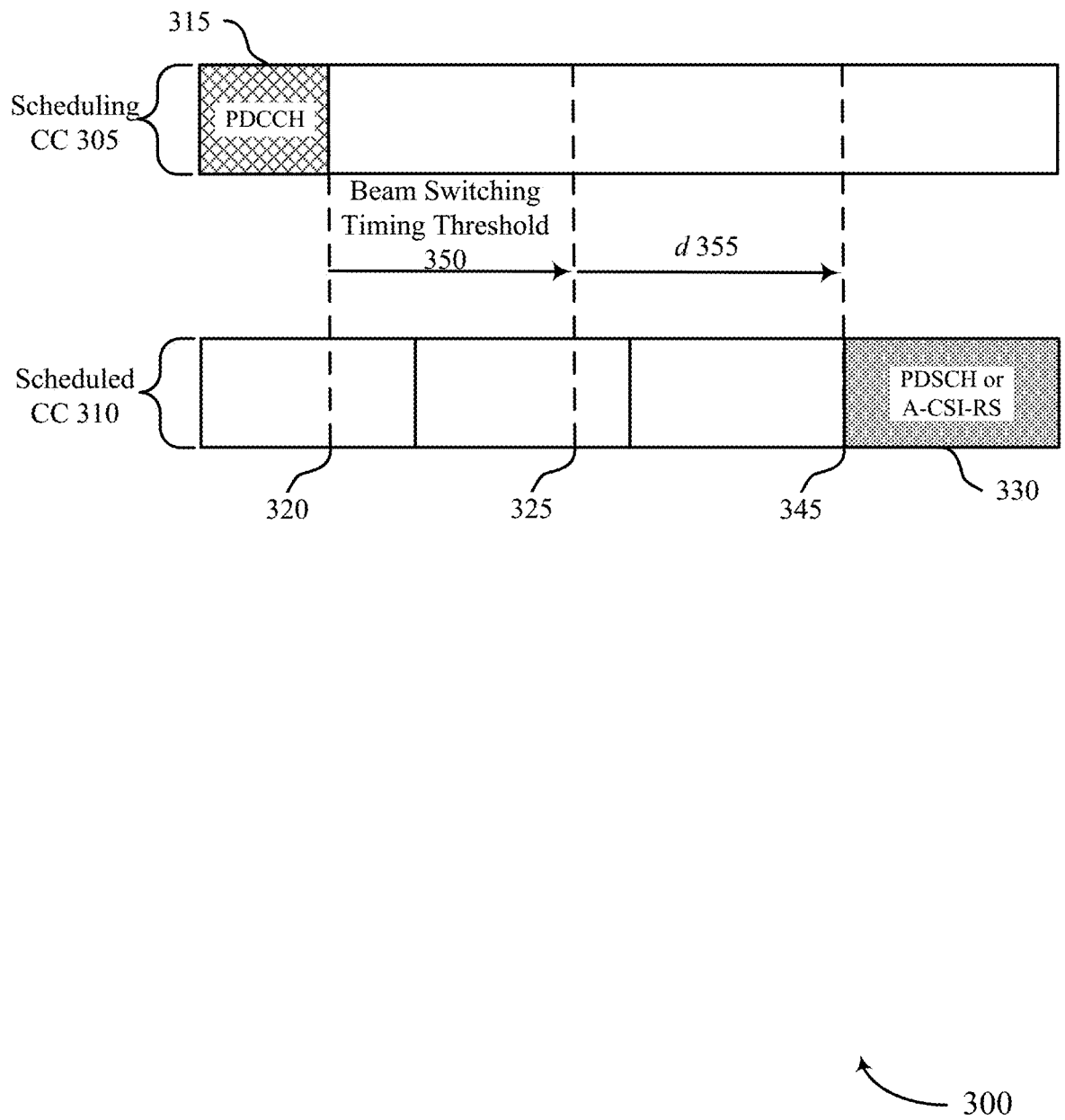
FIG. 3 illustrates an example of a data transmission scheme that supports transmit beam selection schemes for multiple TRPs in accordance with aspects of the present disclosure.

FIG. 3 illustrates an example of a data transmission scheme 300 that supports transmit beam selection schemes for multiple TRPs in accordance with aspects of the present disclosure. In some examples, data transmission scheme 300 may implement aspects of wireless communications system 100. A UE 115 and a base station 105 may use data transmission schemes 300 for cross-carrier scheduling. In some cases, a base station 105 may transmit a PDCCH 315-a which may contain a downlink grant, which may be an example of downlink grant 210-a and downlink grant 210-b from communication system 200. PDCCH 315-a may schedule a data transmission 330 which may be an example of the data transmission 220-a from communication system 200.

In data transmission scheme 300, PDCCH 315 ends at a first time 320. Beam switching timing threshold 350 begins at first time 320. The duration of the beam switching timing threshold may be defined as timeDurationForQCL for PDSCH scheduling or beamSwitchTiming for A-CSI-RS triggering, with units of PDSCH or A-CSI-RS symbols. The beam switching timing threshold ends at a second time 325. If the SCS of the scheduling CC 305 is greater than the SCS of the scheduled CC 310, then data transmission 330 may begin after second time 325. If the SCS of the scheduling CC 405 is less than the SCS of the scheduled CC 310, then d is added to the beam switching timing threshold.

The value of the d may be a function of transmission parameters. The value of d may be a function of PDCCH SCS. The value of d may also be a function of the scheduling scheme and the transmission scheme. For example, there may be a specified value of d for all combinations of possible PDCCH SCS, scheduling schemes (e.g., cross carrier and same carrier), and transmission scheme (single-TRP, multi-TRP/TDM, multi-TRP/FDM, multi-TRP/SDM, or SFN).

In some examples, the time between the PDCCH 315 and the data transmission 330 (e.g., PDSCH or A-CSI-RS) may be less than the beam switching timing threshold 350 plus the d 355. In this case, a UE 115 may not have enough time to switch beams for data transmission 330. In some cases, the UE 115 may use a default QCL rule. In some cases, UE 115-a may use a default transmit beam for data transmission 330 instead of the transmit beam configuration transmitted in downlink grant 210-a.

Figure 4:
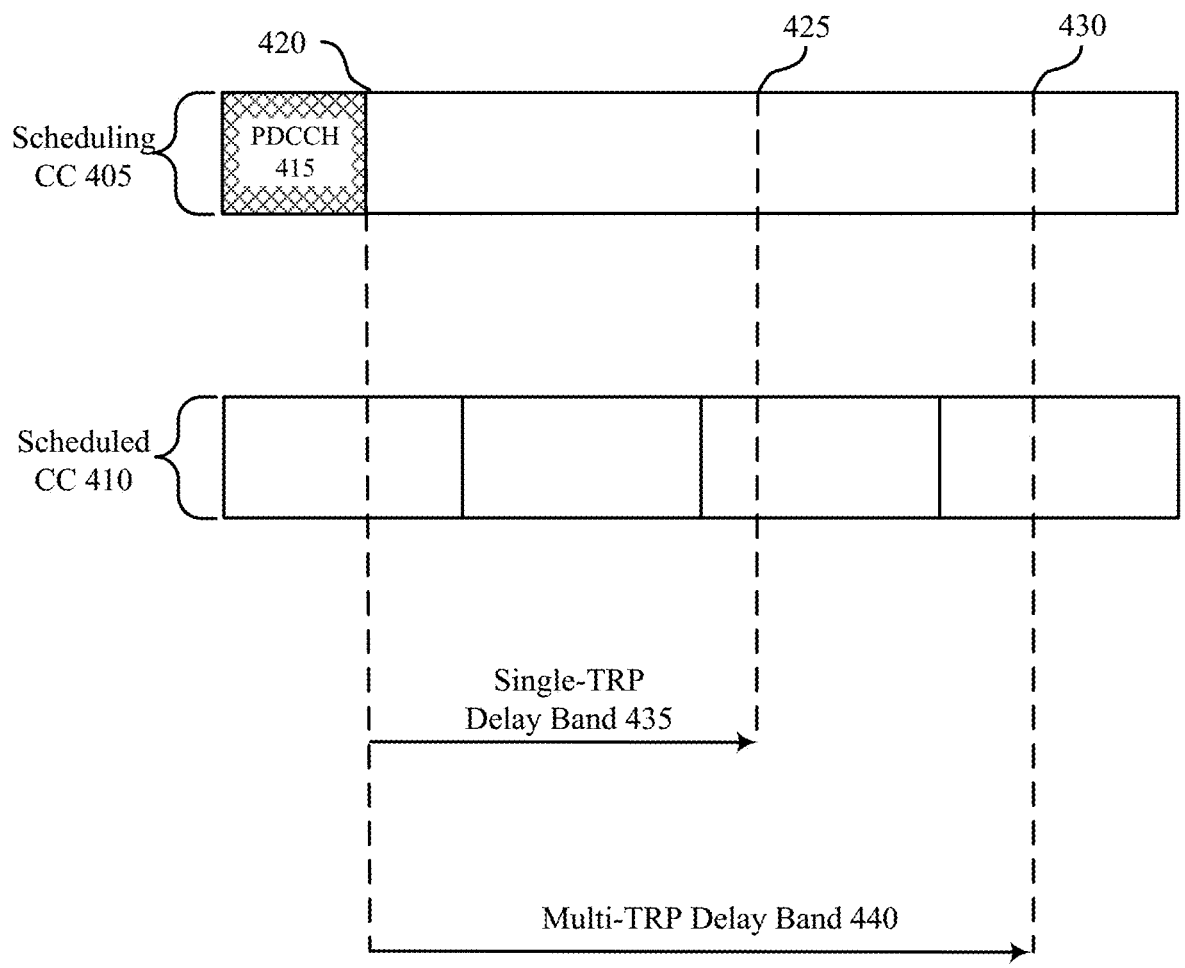
FIG. 4 illustrates an example of a data transmission scheme that supports transmit beam selection schemes for multiple TRPs in accordance with aspects of the present disclosure.

FIG. 4 illustrates an example of a data transmission scheme 400 that supports transmit beam selection schemes for multiple TRPs in accordance with aspects of the present disclosure. In some examples, data transmission scheme 400 may implement aspects of wireless communications system 100. A UE 115 and a base station 105 may use data transmission schemes 400 for cross-carrier scheduling. In some cases, a base station 105 may transmit a PDCCH 415 on a scheduling CC 405 which may contain a downlink grant, which may be an example of downlink grant 210-a and downlink grant 210-b from communication system 200. PDCCH 415 may schedule a data transmission on a scheduled CC 410, which may be an example of data transmission 220-a from communication system 200.

In data transmission scheme 400, a base station 105 may transmit a PDCCH to UE 115 on a scheduling CC 405 and schedule a data transmission on a scheduled CC 410. UE 115 may take a period of time to change beams. This period of time may be a beam switching timing threshold. UE 115 may take additional delay time d to change beams when using cross-carrier scheduling. The total period of time that UE 115 may take to change beams may be the beam switching timing threshold plus d. In some cases, the beam switching timing threshold plus d for PDSCH scheduling may equal timeDurationForQCL+d. In some cases, the beam switching timing threshold plus d for A-CSI-RS triggering may equal beamSwitchTiming+d.

In some cases, the value of d may be different depending on the transmission scheme being used by UE 115. Single-TRP delay band 435 may correspond to the total time UE 115 may take to change beams when using a single-TRP scheme. Single-TRP delay band 435 may be defined as timedurationForQCL+d (single-TRP, cross-carrier) for PDSCH or beamSwitchingTiming+d (single-TRP, cross-carrier) for A-CSI-RS. Single-TRP delay band 435 may start at first time 420, corresponding to the end of PDCCH 415. Single-TRP delay band 435 may end at second time 425. Multi-TRP delay band 440 may correspond to the total time UE 115 may take to change beams when using a multi-TRP scheme. Multi-TRP delay band 440 may be defined as timeDurationForQCL+d (multi-TRP, cross-carrier) for PDSCH or beamSwitchingTiming+d (multi-TRP, cross-carrier) for A-CSI-RS. Multi-TRP delay band 440 may start at first time 420, corresponding to the end of PDCCH 415. Multi-TRP delay band 440 may end at third time 430.

In some examples, UE 115 may use a single-TRP scheme, while base station 105 may transmit PDCCH 415 and schedule a PDSCH after second time 425. In this example, the PDSCH may be transmitted using the QCL indicated by the DCI in the PDCCH 415. In another example, UE 115 may use a multi-TRP scheme, and base station 105 may transmit PDCCH 415 and schedule a PDSCH after third time 430. In this example, the PDSCH may be transmitted using the QCL indicated by the DCI in the PDCCH 415.

In some cases, a base station 105 may transmit a PDCCH 415 and schedule a PDSCH or A-CSI-RS transmission where the PDCCH-to-PDSCH or PDCCH-to-A-CSI-RS delay is less than the beam switching timing of UE 115. UE 115 may use a default transmit beam; however, in some examples, where the beam switching timing threshold changes depending on the transmission scheme, it may be ambiguous which default transmit beam to use.

UE 115 may determine which transmission scheme will be used for default transmit beams. UE 115 may indicate to base station 105 which transmission scheme will be used for default beams. In some cases, UE 115 may indicate which transmission scheme will be used for default beams by indicating a priority. In some cases, the priority may indicate a preferred transmission scheme from the set of different transmission schemes that UE 115 supports. In some cases, UE 115 may indicate a priority preference to base station 105 in a UE capability report or UE assistance information. In some cases, the priority for UE 115 may be predetermined in a specification. The specification may define a set of priority rules based at least on UE 115 parameters.

In some examples, determining a default beam may depend on the transmission scheme being used by the UE and if the DCI in the PDCCH configures same-carrier scheduling or cross-carrier scheduling. In some examples, a UE may use a single-TRP or a multi-TRP transmission scheme.

In some cases, when a single-TRP transmission scheme is used, a single default transmit beam, or activated TCI state, may be specified. In the case of a same-carrier scheduling with a single-TRP scheme, the UE may follow the QCL assumption of the lowest CORESET ID monitored in the latest slot. In the case of a cross-carrier scheduling case with a single-TRP scheme, the UE may follow the QCL assumption of the lowest TCI state ID among the activated TCI states.

In some cases, when a UE is using a multi-TRP transmission scheme, two default transmit beams may be specified. In some cases, the UE may receive a single DCI. For the default transmit beams in a single DCI case, the UE may follow the QCL assumption of the TCI states corresponding to the lowest TCI codepoint that contains two TCI states. In some cases, the UE may receive multiple DCIs. For the default transmit beams in a multi-DCI case, the UE may follow the QCL assumptions of the lowest CORESET ID within each CORESETPoolIndex in the latest slot.

In some examples, the TCI codepoints may correspond to Activated TCI states as shown in Table 1 below.

TABLE 1

| TCI Codepoint | Activated TCI States | TRP Status |
| --- | --- | --- |
| 0 | TCI #1 | Single-TRP |
| 1 | TCI #3 | Single-TRP |
| 2 | TCI #1, TCI #3 | Multi-TRP |
| 3 | TCI #2 | Single-TRP |
| 4 | TCI #4 | Single-TRP |
| 5 | TCI #2, TCI #4 | Multi-TRP |

In some cases, the lowest TCI codepoint that contains two TCI states and the lowest TCI codepoint that contains one TCI state may be determined and indicated by UE 115 or a specification.

In some examples, if a UE determines a priority for a default QCL based on a multi-TRP scheme and if the DCI in PDCCH 415 indicates that the PDSCH is to be transmitted by using a single-TRP scheme, then the UE may use TCI codepoint 2 for the default QCL. If a UE determines a priority for a default QCL based on a multi-TRP scheme and if the DCI in PDCCH 415 indicates that the PDSCH is to be transmitted by using a multi-TRP scheme, then the UE may use TCI codepoint 2 for the default QCL.

In some cases, if a UE determines a priority for a default QCL based on a single-TRP scheme and if the DCI in PDCCH 415 indicates that the PDSCH is to be transmitted by using a single-TRP scheme, then the UE may use TCI codepoint 0 for the default QCL. If a UE determines a priority for a default QCL based on a single-TRP scheme and if the DCI in PDCCH 415 indicates that the PDSCH is to be transmitted by using a multi-TRP scheme, then the UE may use TCI codepoint 0 for the default QCL.

In some examples, if a UE determines a priority for a default QCL based on DCI and if the DCI in the PDCCH 415 indicates that the PDSCH is to be transmitted by using a single TRP scheme, then the UE may use TCI codepoint 0 for the default QCL. If a UE determines a priority for a default QCL based on DCI and if the DCI in the PDCCH 415 indicates that the PDSCH is to be transmitted by using a multi-TRP scheme, then the UE may use TCI codepoint 2 for the default QCL.

Figure 5:
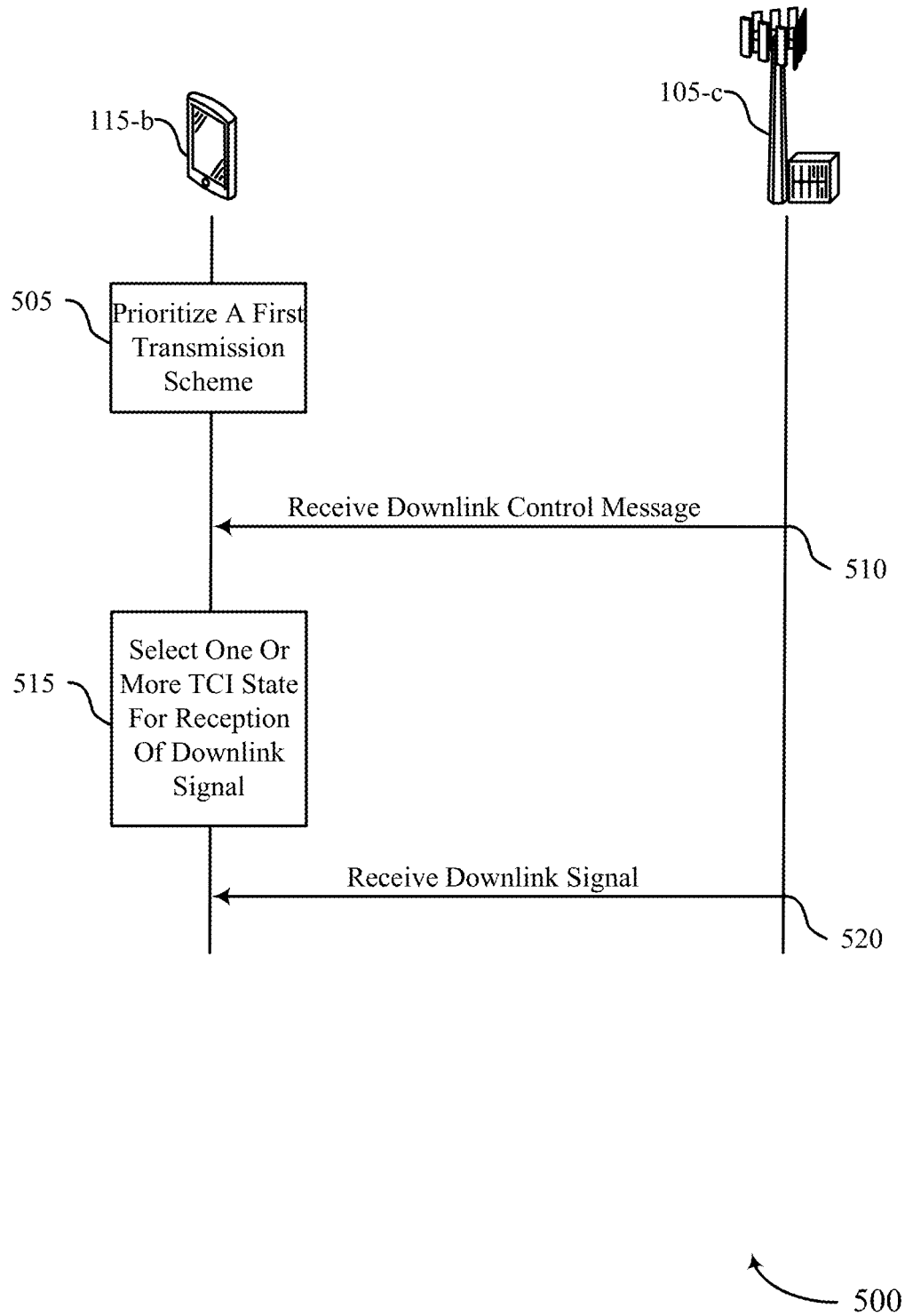
FIG. 5 illustrates an example of a process flow that supports transmit beam selection schemes for multiple TRPs in accordance with aspects of the present disclosure.

FIG. 5 illustrates an example of a process flow 500 that supports transmit beam selection schemes for multiple TRPs in accordance with aspects of the present disclosure. In some examples, process flow 500 may implement aspects of wireless communications system 100. UE 115-*b* and base station 105-*c* may be examples of UE 115 and base station 105, respectively, as described with reference to FIG. 1. Process flow 500 illustrates an example of a process by which UE 115 transmits beam selection schemes for multiple TRPs.

At 505, UE 115-*c* may prioritize a first transmission scheme among a set of transmission schemes to use for a TCI determination. In some examples, the first transmission scheme may be a single TRP scheme that includes identifying a set of TCI codepoints corresponding to the set of transmission configuration states, determining a codepoint of the set of TCI codepoints corresponding to a lowest codepoint that is associated with multiple TCI states, and selecting the one or more TCI states based at least in part on the codepoint.

At 510, UE 115-c may receive, from base station 105-c via a first carrier, a downlink control message that schedules a downlink signal for the UE via a second carrier.

At 515, UE 115-c may select one or more TCI states of a set of TCI states for reception of the downlink signal based at least in part on the prioritization of the first transmission scheme. In some examples, UE 115-c may select the TCI indication states independent of a second transmission scheme indicated by the downlink control message.

At 520, UE 115-c may receive the downlink signal via the second carrier in accordance with the selected TCI states. In some examples, UE 115-c may determine QCL information for the downlink signal based at least in part on the downlink control message and selecting the one or more TCI states as a default TCI state based at least in part on the quasi-colocation information.

Figure 6:
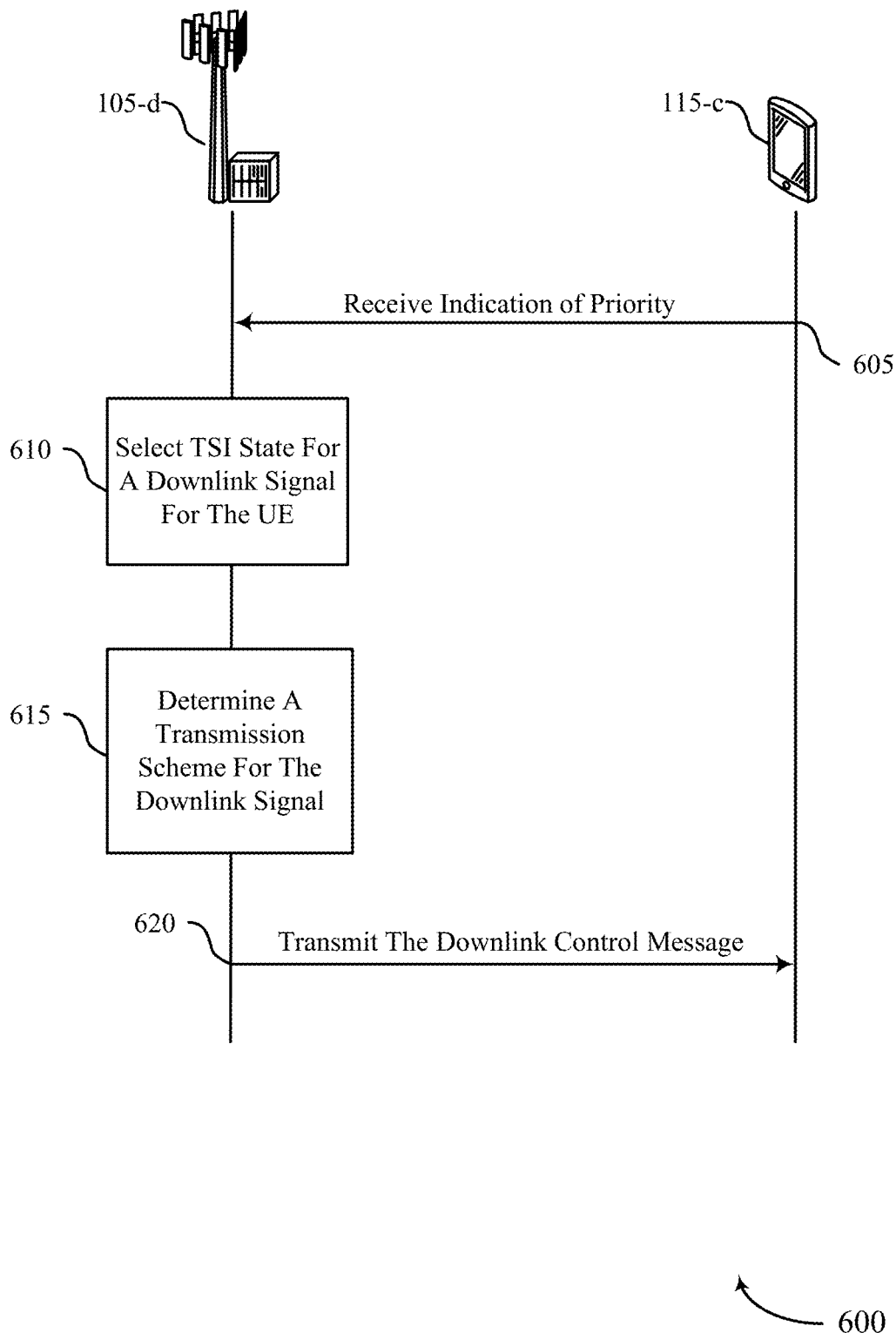
FIG. 6 illustrates an example of a process flow that supports transmit beam selection schemes for multiple TRPs in accordance with aspects of the present disclosure.

FIG. 6 illustrates an example of a process flow 600 that supports transmit beam selection schemes for multiple TRPs in accordance with aspects of the present disclosure. In some examples, process flow 600 may implement aspects of wireless communications system 100. UE 115-c and base station 105-d may be examples of UE 115 and base station 105, respectively, as described with reference to FIG. 1. Process flow 600 illustrates an example of a process by which base station 105-d transmits beam selection schemes for multiple TRPs.

At 605, base station 105-d may receive, from UE 115-c, an indication of a first transmission scheme that is prioritized among a set of transmission schemes supported by the UE. In some cases, base station 105-d may receive a UE capability report or UE assistance information indicating priority of the first transmission scheme over other transmission schemes of the set of transmission schemes. In some examples, base station 105-d may receive a UE capability report or UE assistance information indicating respective priority levels for each of the set of transmission schemes.

At 610, base station 105-d may select on or more TCI states of a set of transmission schemes supported by UE 115.

At 615, base station 105-d may transmit, to UE 115-c via a first carrier, a downlink control message that schedules a downlink signal for the UE via a second carrier based at least in part on the selected TCI states or states. In some examples, base station 105-d may determine one or more transmit beams used for transmission of the downlink signal based at least in part on the selected one or more TCI states and transmit the downlink signal based at least in part on the one or more transmit beams. In some examples, base station 105-d may determine a beam switch timing interval based at least in part on the downlink control message, wherein the one or more TCI states are selected based at least in part on the beam switch timing threshold. In some examples, base station 105-d may transmit QCL information in the downlink control message to the UE.

Figure 7:
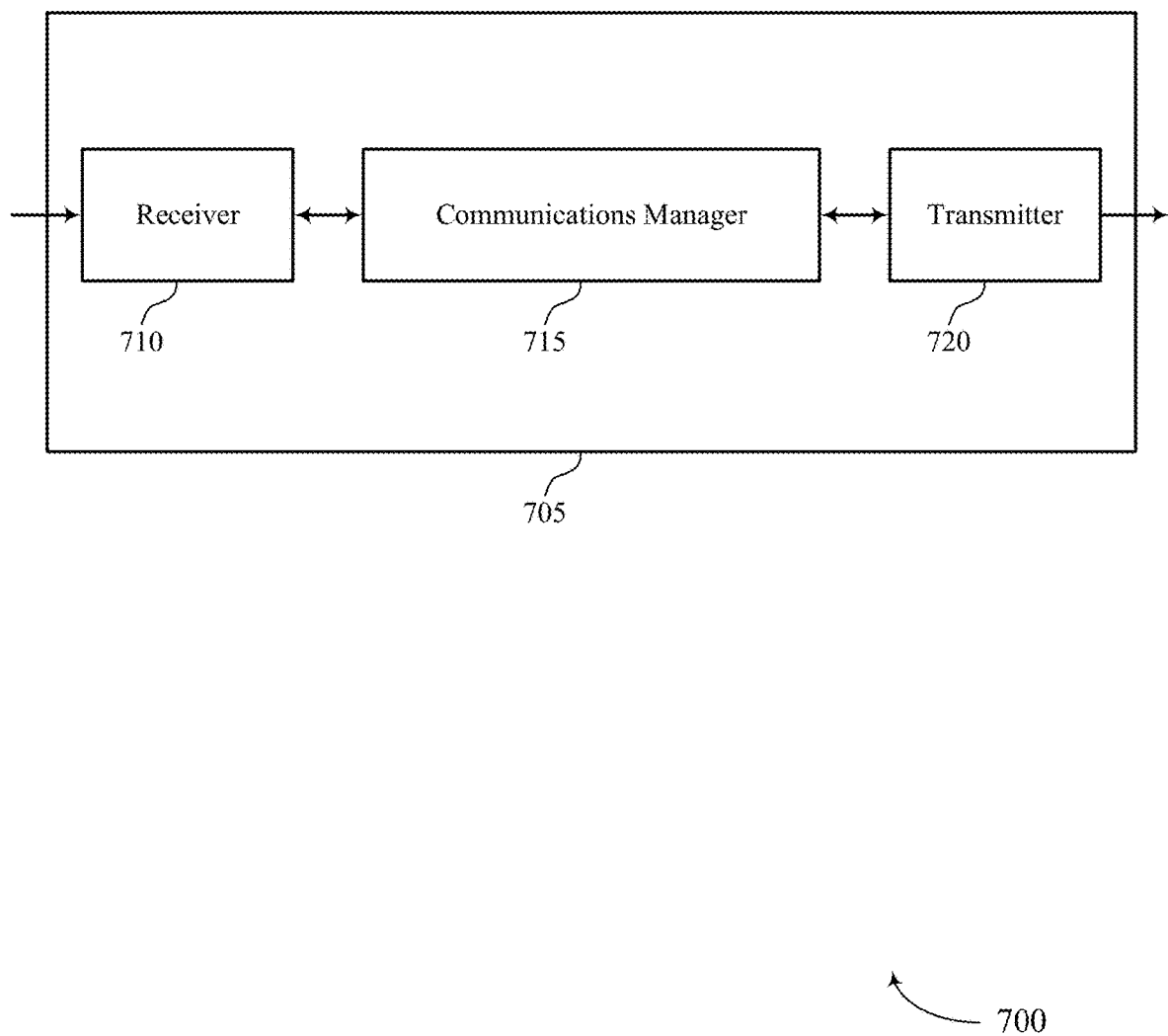
FIG. 7 shows a block diagram of a device that supports transmit beam selection schemes for multiple TRPs in accordance with aspects of the present disclosure.

FIG. 7 shows a block diagram 700 of a device 705 that supports transmit beam selection schemes for multiple TRPs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to transmit beam selection schemes for multiple TRPs, etc.). Information may be passed on to other components of the device 705. The receiver 710 may be an example of aspects of the transceiver 1820 described with reference to FIG. 18. The receiver 710 may utilize a single antenna or a set of antennas.

The communications manager 715 may prioritize a first transmission scheme among a set of transmission schemes to use for a TCI determination, receive, from a first TRP of multiple TRPs and via a first carrier, a downlink control message that schedules a downlink signal for the UE via a second carrier, select one or more TCI states of a set of TCI states for reception of the downlink signal based on the prioritization of the first transmission scheme, and receive the downlink signal via the second carrier in accordance with the selected one or more TCI states. The communications manager 715 may be an example of aspects of the communications manager 1810 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1820 described with reference to FIG. 18. The transmitter 720 may utilize a single antenna or a set of antennas.

In some examples, the communications manager 715 may be implemented as an integrated circuit or chipset for a mobile device modem, and the receiver 710 and transmitter 920 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device 705 to provide assistance for scheduling data transmissions between the device 705 and a base station. Based on the techniques for scheduling and configuring data transmissions between the device 705 and the base station, the device 705 may support determining and indicating a priority for default QCL for transmitting PDSCH and A-CSI-RS; therefore, device 705 may support more efficient resource utilization and more effectively be configured for receiving downlink messages.

As such, the device 705 may increase the likelihood of accurately scheduling a PDSCH or triggering a A-CSI-RS using default QCL. Accordingly, device 705 may communicate over the channel with a greater likelihood of successful communications. In some examples, based on a greater likelihood of successful communications, the device 705 may more efficiently power a processor or one or more processing units associated with an PDSCH scheduling or A-CSI-RS triggering procedure and transmitting and receiving communications, which may enable the device to save power, increase battery life, and improve quality of service.

Figure 8:
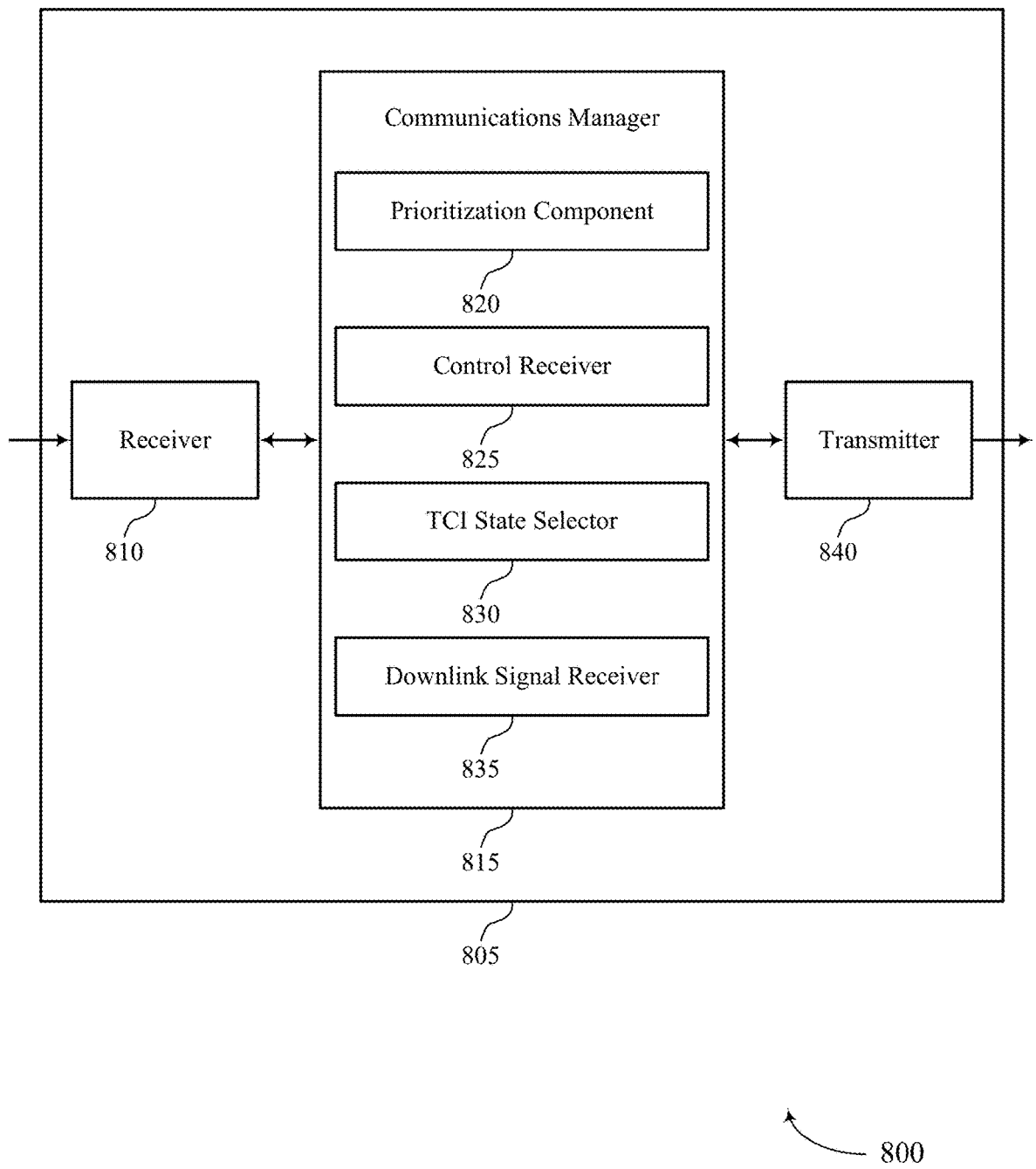
FIG. 8 shows a block diagram of a device that supports transmit beam selection schemes for multiple TRPs in accordance with aspects of the present disclosure.

FIG. 8 shows a block diagram 800 of a device 805 that supports transmit beam selection schemes for multiple TRPs in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to transmit beam selection schemes for multiple TRPs, etc.). Information may be passed on to other components of the device 805. The receiver 810 may be an example of aspects of the transceiver 1820 described with reference to FIG. 18. The receiver 810 may utilize a single antenna or a set of antennas.

The communications manager 815 may be an example of aspects of the communications manager 715 as described herein. The communications manager 815 may include a prioritization component 820, a control receiver 825, a TCI state selector 830, and a downlink signal receiver 835. The communications manager 815 may be an example of aspects of the communications manager 1810 described herein.

The prioritization component 820 may prioritize a first transmission scheme among a set of transmission schemes to use for a TCI determination.

The control receiver 825 may receive, from a first TRP of multiple TRPs and via a first carrier, a downlink control message that schedules a downlink signal for the UE via a second carrier.

The TCI state selector 830 may select one or more TCI states of a set of TCI states for reception of the downlink signal based on the prioritization of the first transmission scheme.

The downlink signal receiver 835 may receive the downlink signal via the second carrier in accordance with the selected one or more TCI states.

The transmitter 840 may transmit signals generated by other components of the device 805. In some examples, the transmitter 840 may be collocated with a receiver 810 in a transceiver module. For example, the transmitter 840 may be an example of aspects of the transceiver 1820 described with reference to FIG. 18. The transmitter 840 may utilize a single antenna or a set of antennas.

Figure 9:
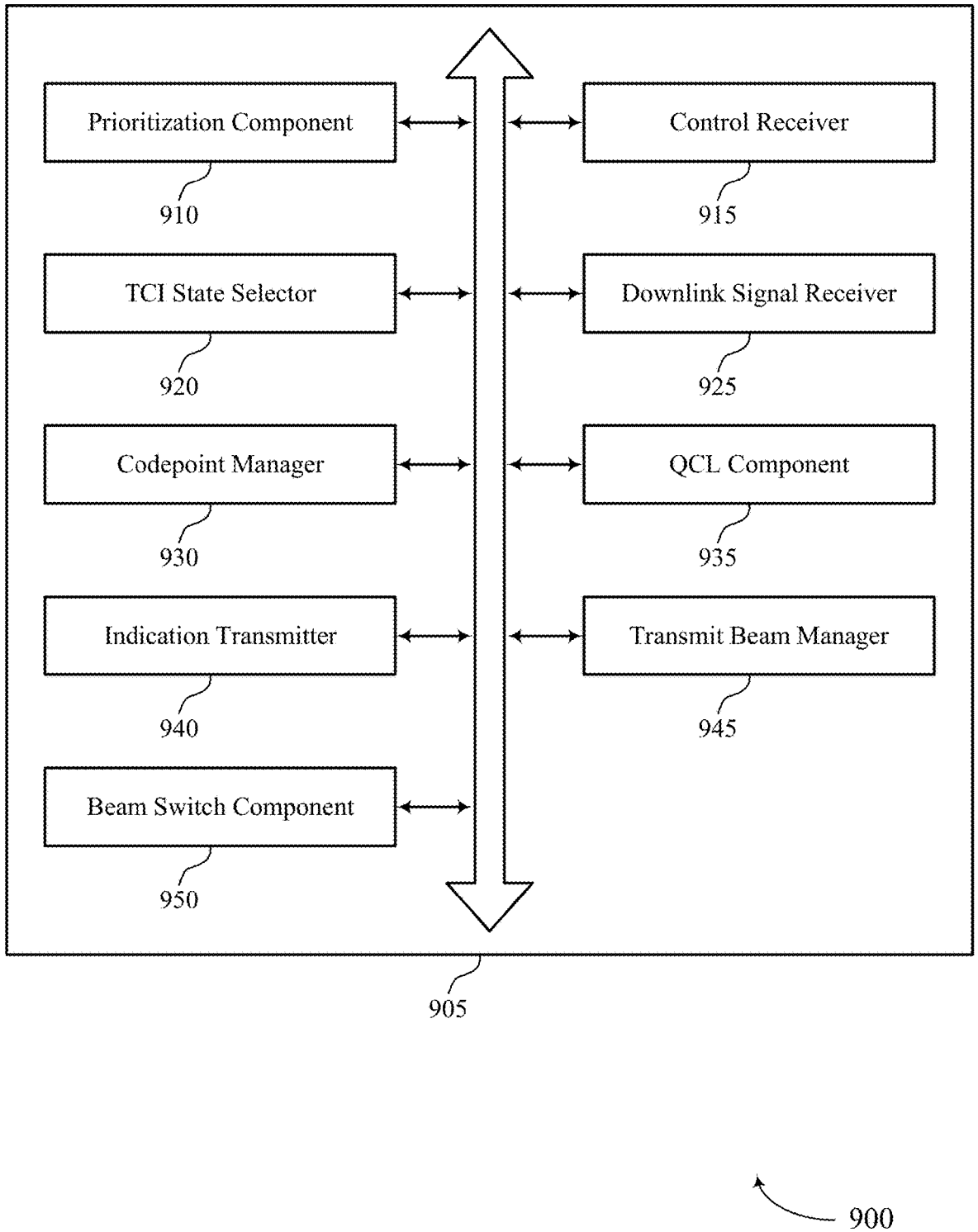
FIG. 9 shows a block diagram of a communications manager that supports transmit beam selection schemes for multiple TRPs in accordance with aspects of the present disclosure.

FIG. 9 shows a block diagram 900 of a communications manager 905 that supports transmit beam selection schemes for multiple TRPs in accordance with aspects of the present disclosure. The communications manager 905 may be an example of aspects of a communications manager 715, a communications manager 815, or a communications manager 1810 described herein. The communications manager 905 may include a prioritization component 910, a control receiver 915, a TCI state selector 920, a downlink signal receiver 925, a codepoint manager 930, a QCL component 935, an indication transmitter 940, a transmit beam manager 945, and a beam switch component 950. Each of these modules may communicate, directly or indirectly, with one another (e.g., via one or more buses).

The prioritization component 910 may prioritize a first transmission scheme among a set of transmission schemes to use for a TCI determination.

In some examples, the prioritization component 910 may determine the first transmission scheme to be a cross carrier scheme based on the second carrier being different than the first carrier.

In some examples, the prioritization component 910 may determine the first transmission scheme to be a same carrier scheme based on the second carrier being the same as the first carrier.

In some examples, the prioritization component 910 may determine the first transmission scheme to be a single TRP scheme based on the downlink signal being scheduled for transmission by a first TRP.

In some examples, the prioritization component 910 may determine the first transmission scheme to be a multiple TRP scheme based on the downlink signal being scheduled for transmission by a second TRP of the multiple TRPs.

The control receiver 915 may receive, from a first TRP of multiple TRPs and via a first carrier, a downlink control message that schedules a downlink signal for the UE via a second carrier.

The TCI state selector 920 may select one or more TCI states of a set of TCI states for reception of the downlink signal based on the prioritization of the first transmission scheme.

In some examples, the TCI state selector 920 may select the one or more TCI states independent of a second transmission scheme indicated by the downlink control message.

In some examples, the TCI state selector 920 may select the one or more TCI states based on the codepoint.

In some examples, the TCI state selector 920 may select the one or more TCI states as a default TCI state based on the quasi-colocation information.

The downlink signal receiver 925 may receive the downlink signal via the second carrier in accordance with the selected one or more TCI states.

In some examples, the downlink signal receiver 925 may receive the downlink signal based on the one or more transmit beams.

The codepoint manager 930 may identify a set of TCI codepoints corresponding to the set of TCI states.

In some examples, the codepoint manager 930 may determine a codepoint of the set of TCI codepoints corresponding to a lowest codepoint that is associated with multiple TCI states.

In some examples, the codepoint manager 930 may determine a codepoint of the set of TCI codepoints corresponding to a lowest codepoint that is associated with a single TCI state.

The QCL component 935 may determine quasi-colocation information for the downlink signal based on the downlink control message.

In some examples, the QCL component 935 may determine default quasi-colocation information corresponding to the selected one or more TCI states based on the downlink signal being scheduled within the beam switch timing interval.

In some examples, the QCL component 935 may determine quasi-colocation information corresponding to the selected one or more TCI states based on the downlink control message.

The indication transmitter 940 may transmit an indication of the prioritized first transmission scheme to the first TRP, where the downlink signal is received based on the indication.

In some examples, the indication transmitter 940 may transmit a UE capability report or UE assistance information indicating priority of the first transmission scheme over other transmission schemes of the set of transmission schemes.

In some examples, the indication transmitter 940 may transmit a UE capability report or UE assistance information indicating respective priority levels for each of the set of transmission schemes.

The transmit beam manager 945 may determine one or more transmit beams used for transmission of the downlink signal based on the selected one or more TCI states.

The beam switch component 950 may determine a beam switch timing interval based on a second transmission scheme indicated by the downlink control message, where the one or more TCI states are selected based on the beam switch timing interval.

Figure 10:
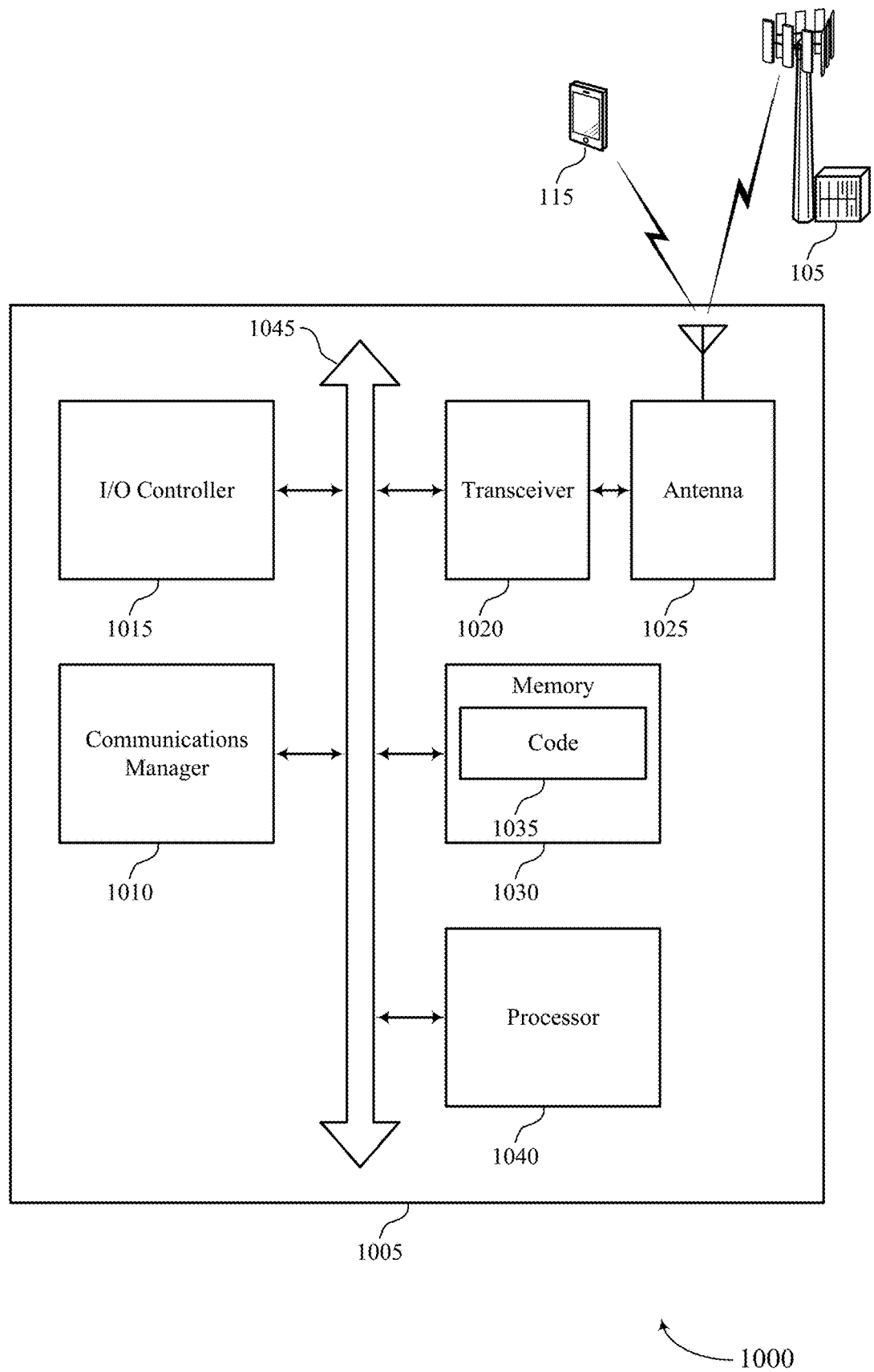
FIG. 10 shows a diagram of a system including a device that supports transmit beam selection schemes for multiple TRPs in accordance with aspects of the present disclosure.

FIG. 10 shows a diagram of a system 1000 including a device 1005 that supports transmit beam selection schemes for multiple TRPs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may prioritize a first transmission scheme among a set of transmission schemes to use for a TCI determination, receive, from a first TRP of multiple TRPs and via a first carrier, a downlink control message that schedules a downlink signal for the UE via a second carrier, select one or more TCI states of a set of TCI states for reception of the downlink signal based on the prioritization of the first transmission scheme, and receive the downlink signal via the second carrier in accordance with the selected one or more TCI states.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmit beam selection schemes for multiple TRPs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
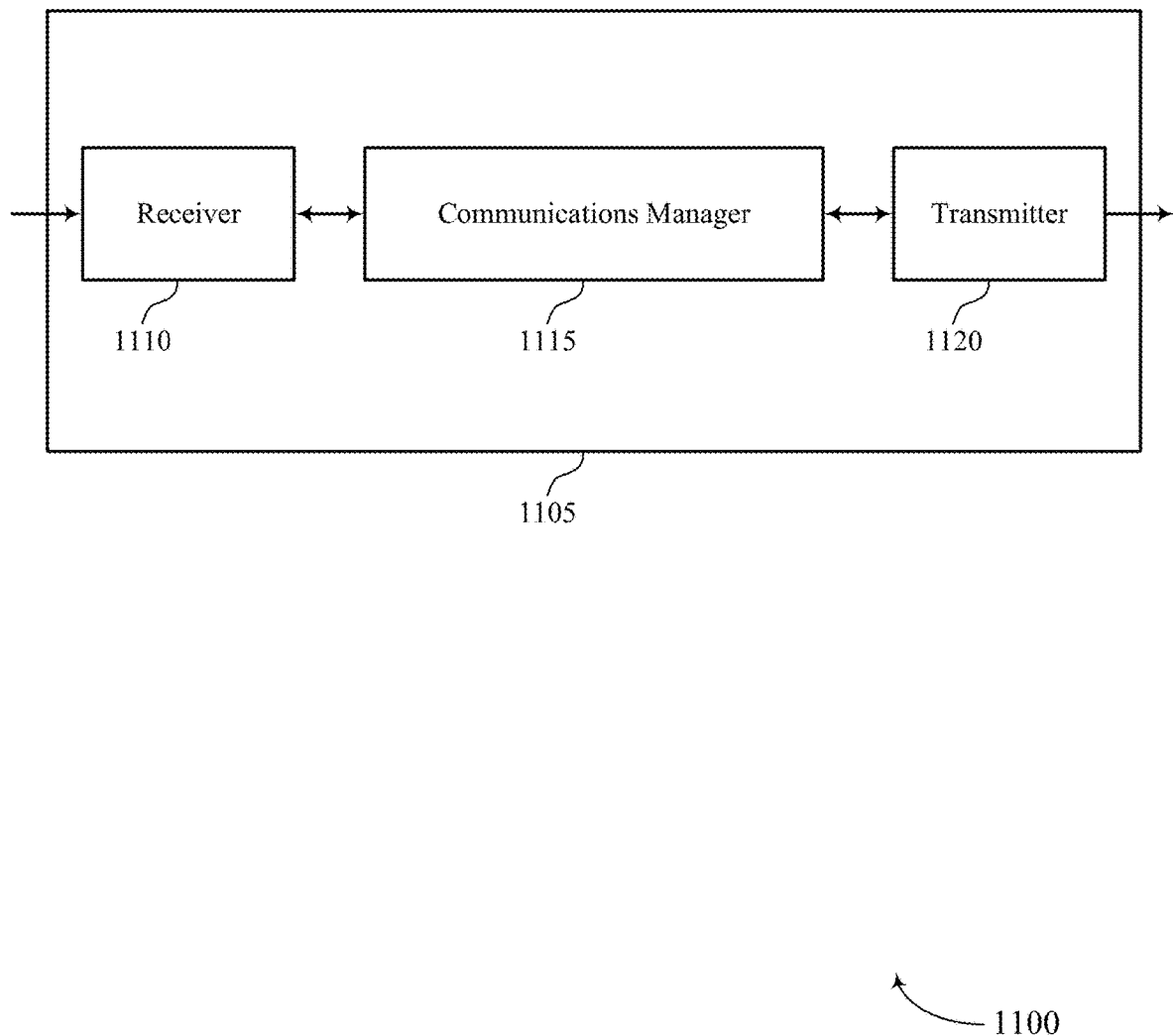
FIG. 11 shows a block diagram of a device that supports transmit beam selection schemes for multiple TRPs in accordance with aspects of the present disclosure.

FIG. 11 shows a block diagram 1100 of a device 1105 that supports transmit beam selection schemes for multiple TRPs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to transmit beam selection schemes for multiple TRPs, etc.). Information may be passed on to other components of the device 1105. The receiver 1110 may be an example of aspects of the transceiver 2220 described with reference to FIG. 22. The receiver 1110 may utilize a single antenna or a set of antennas.

The communications manager 1115 may receive, from a UE, an indication of a first transmission scheme that is prioritized among a set of transmission schemes supported by the UE, select one or more TCI states of a set of TCI states a downlink signal for the UE based on the first transmission scheme, and transmit, to the UE and via a first carrier, a downlink control message that schedules the downlink signal for the UE via a second carrier based on the selected one or more TCI states. The communications manager 1115 may be an example of aspects of the communications manager 2210 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 2220 described with reference to FIG. 22. The transmitter 1120 may utilize a single antenna or a set of antennas.

Figure 12:
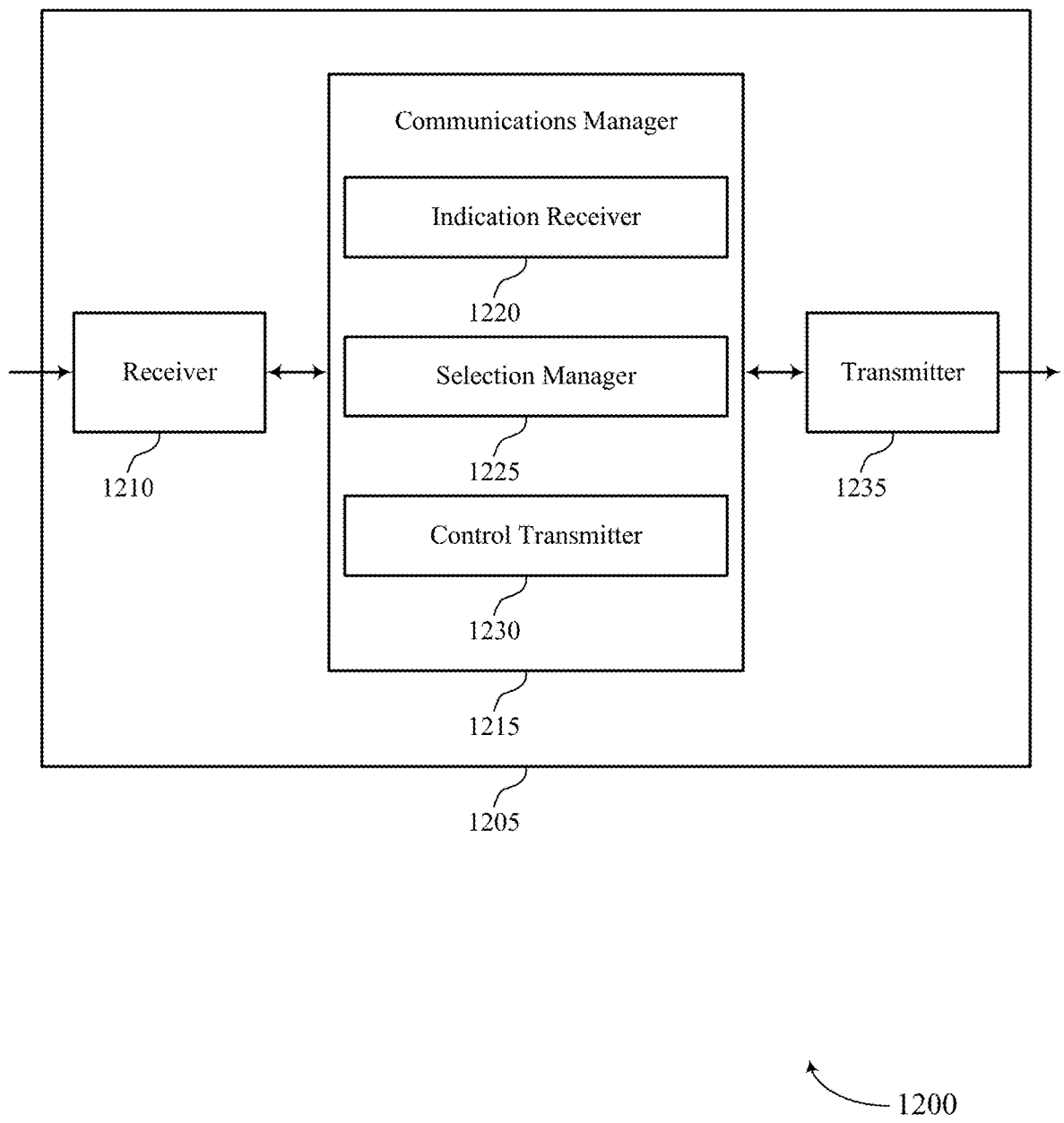
FIG. 12 shows a block diagram of a device that supports transmit beam selection schemes for multiple TRPs in accordance with aspects of the present disclosure.

FIG. 12 shows a block diagram 1200 of a device 1205 that supports transmit beam selection schemes for multiple TRPs in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to transmit beam selection schemes for multiple TRPs, etc.). Information may be passed on to other components of the device 1205. The receiver 1210 may be an example of aspects of the transceiver 2220 described with reference to FIG. 22. The receiver 1210 may utilize a single antenna or a set of antennas.

The communications manager 1215 may be an example of aspects of the communications manager 1115 as described herein. The communications manager 1215 may include an indication receiver 1220, a selection manager 1225, and a control transmitter 1230. The communications manager 1215 may be an example of aspects of the communications manager 2210 described herein.

The indication receiver 1220 may receive, from a UE, an indication of a first transmission scheme that is prioritized among a set of transmission schemes supported by the UE.

The selection manager 1225 may select one or more TCI states of a set of TCI states a downlink signal for the UE based on the first transmission scheme.

The control transmitter 1230 may transmit, to the UE and via a first carrier, a downlink control message that schedules the downlink signal for the UE via a second carrier based on the selected one or more TCI states.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 2220 described with reference to FIG. 22. The transmitter 1235 may utilize a single antenna or a set of antennas.

Figure 13:
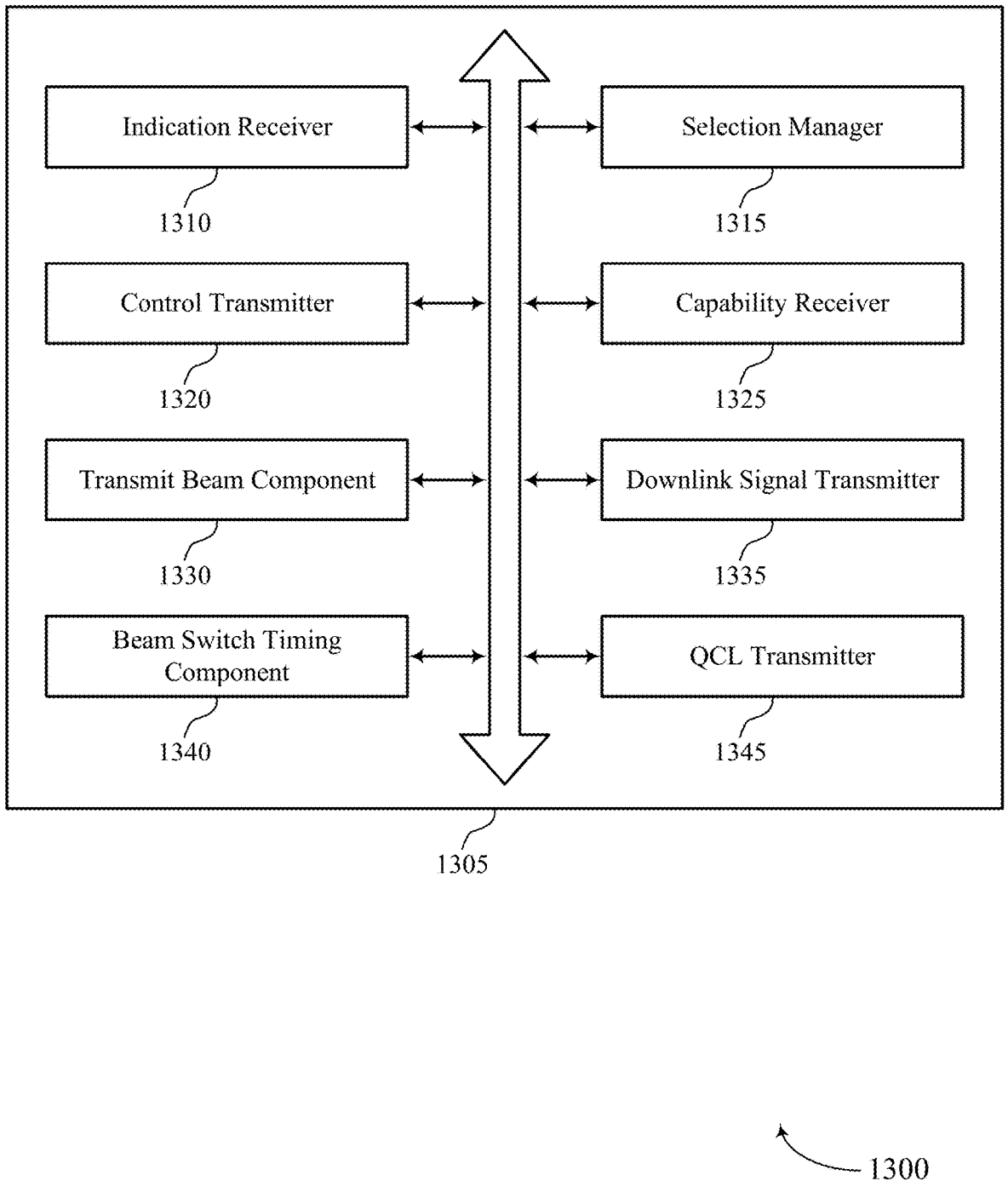
FIG. 13 shows a block diagram of a communications manager that supports transmit beam selection schemes for multiple TRPs in accordance with aspects of the present disclosure.

FIG. 13 shows a block diagram 1300 of a communications manager 1305 that supports transmit beam selection schemes for multiple TRPs in accordance with aspects of the present disclosure. The communications manager 1305 may be an example of aspects of a communications manager 1115, a communications manager 1215, or a communications manager 2210 described herein. The communications manager 1305 may include an indication receiver 1310, a selection manager 1315, a control transmitter 1320, a capability receiver 1325, a transmit beam component 1330, a downlink signal transmitter 1335, a beam switch timing component 1340, and a QCL transmitter 1345. Each of these modules may communicate, directly or indirectly, with one another (e.g., via one or more buses).

The indication receiver 1310 may receive, from a UE, an indication of a first transmission scheme that is prioritized among a set of transmission schemes supported by the UE.

The selection manager 1315 may select one or more TCI states of a set of TCI states a downlink signal for the UE based on the first transmission scheme.

The control transmitter 1320 may transmit, to the UE and via a first carrier, a downlink control message that schedules the downlink signal for the UE via a second carrier based on the selected one or more TCI states.

The capability receiver 1325 may receive a UE capability report or UE assistance information indicating priority of the first transmission scheme over other transmission schemes of the set of transmission schemes.

In some examples, the capability receiver 1325 may receive a UE capability report or UE assistance information indicating respective priority levels for each of the set of transmission schemes.

The transmit beam component 1330 may determine one or more transmit beams used for transmission of the downlink signal based on the selected one or more TCI states.

The downlink signal transmitter 1335 may transmit the downlink signal based on the one or more transmit beams.

The beam switch timing component 1340 may determine a beam switch timing interval based on the downlink control message, where the one or more TCI states are selected based on the beam switch timing interval.

The QCL transmitter 1345 may transmit quasi-colocation information in the downlink control message to the UE.

Figure 14:
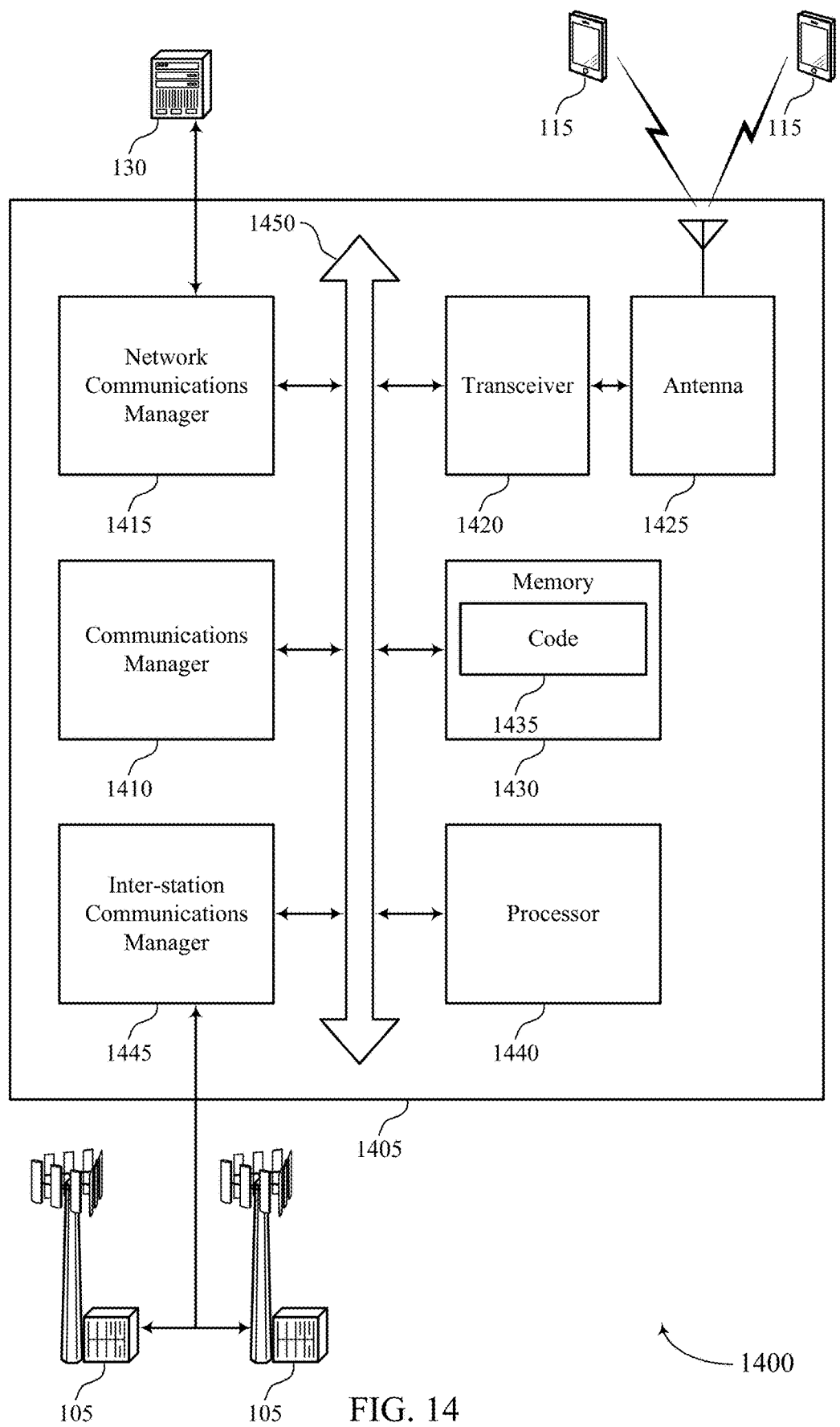
FIG. 14 shows a diagram of a system including a device that supports transmit beam selection schemes for multiple TRPs in accordance with aspects of the present disclosure.

FIG. 14 shows a diagram of a system 1400 including a device 1405 that supports transmit beam selection schemes for multiple TRPs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager

1445. These components may be in electronic communication via one or more buses (e.g., bus 1450).

The communications manager 1410 may receive, from a UE, an indication of a first transmission scheme that is prioritized among a set of transmission schemes supported by the UE, select one or more TCI states of a set of TCI states a downlink signal for the UE based on the first transmission scheme, and transmit, to the UE and via a first carrier, a downlink control message that schedules the downlink signal for the UE via a second carrier based on the selected one or more TCI states.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting transmit beam selection schemes for multiple TRPs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
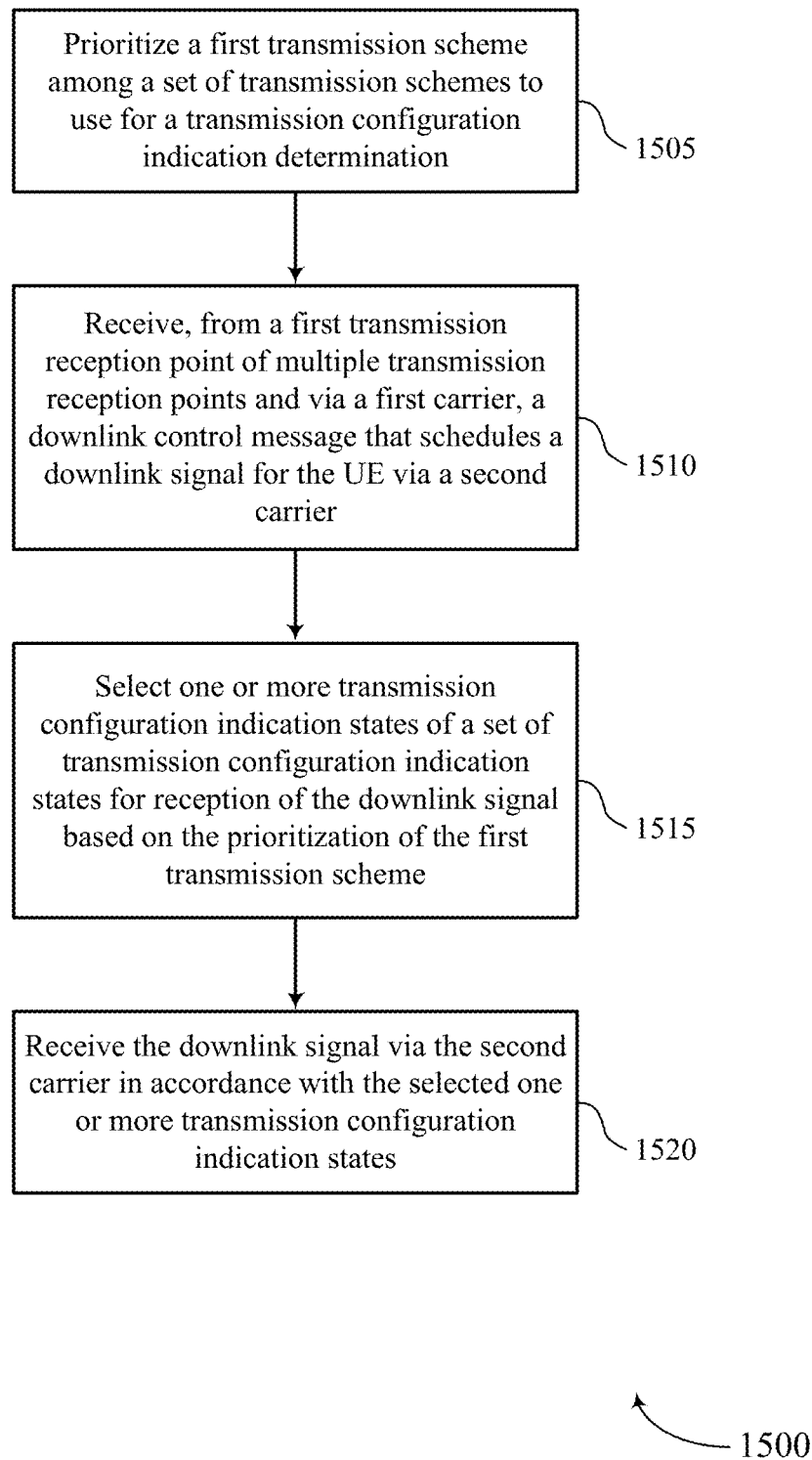
FIGS. 15 through 23 show flowcharts illustrating methods that support transmit beam selection schemes for multiple TRPs in accordance with aspects of the present disclosure.

FIG. 15 shows a flowchart illustrating a method 1500 that supports transmit beam selection schemes for multiple TRPs in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may prioritize a first transmission scheme among a set of transmission schemes to use for a TCI determination. The operations of 1505 may be performed according to the methods described herein. In some examples, aspects of the operations of 1505 may be performed by a prioritization component as described with reference to FIGS. 7 through 10.

At 1510, the UE may receive, from a first TRP of multiple TRPs and via a first carrier, a downlink control message that schedules a downlink signal for the UE via a second carrier. The operations of 1510 may be performed according to the methods described herein. In some examples, aspects of the operations of 1510 may be performed by a control receiver as described with reference to FIGS. 7 through 10.

At 1515, the UE may select one or more TCI states of a set of TCI states for reception of the downlink signal based on the prioritization of the first transmission scheme. The operations of 1515 may be performed according to the methods described herein. In some examples, aspects of the operations of 1515 may be performed by a TCI state selector as described with reference to FIGS. 7 through 10.

At 1520, the UE may receive the downlink signal via the second carrier in accordance with the selected one or more TCI states. The operations of 1520 may be performed according to the methods described herein. In some examples, aspects of the operations of 1520 may be performed by a downlink signal receiver as described with reference to FIGS. 7 through 10.

Figure 16:
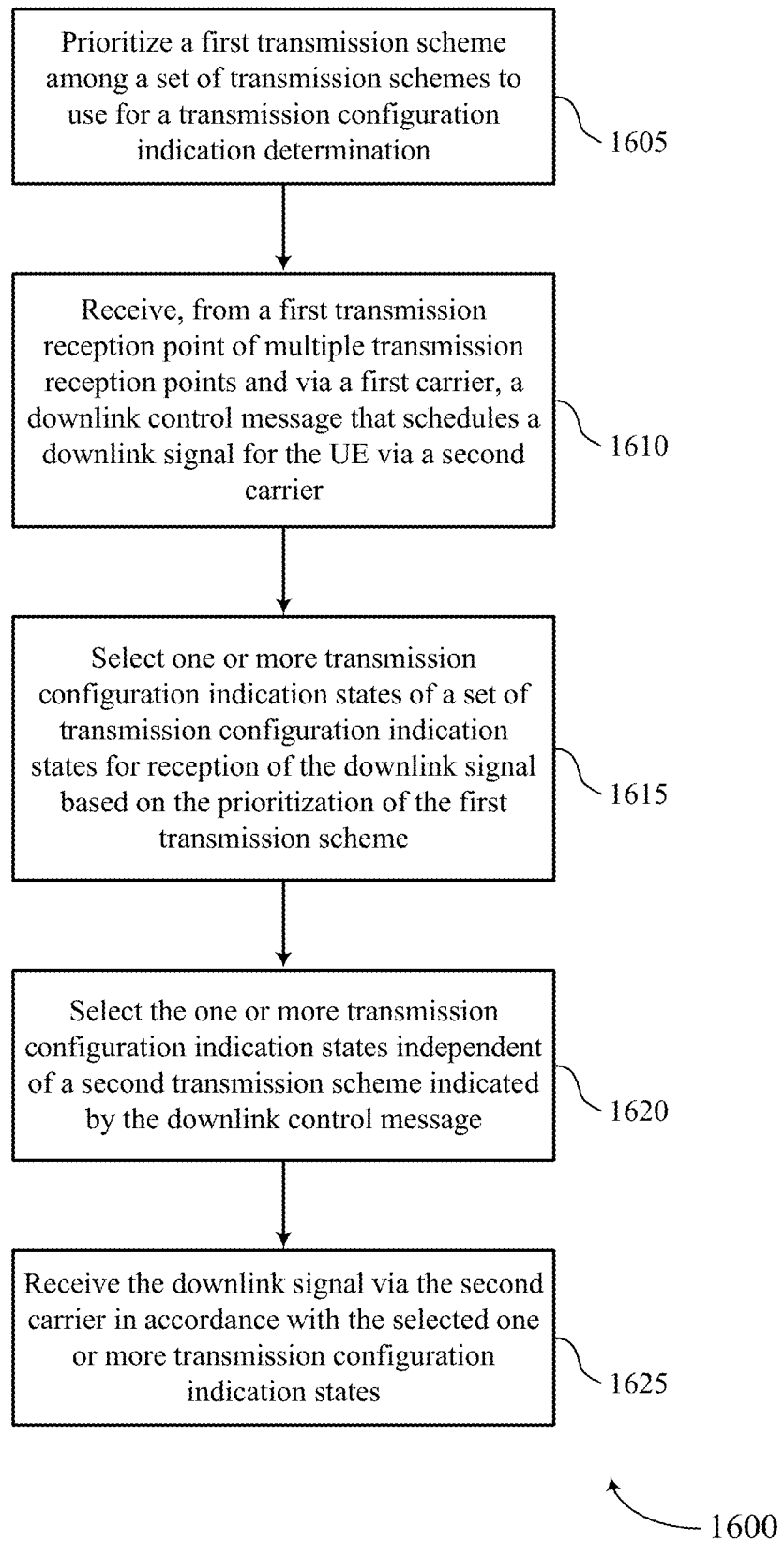

FIG. 16 shows a flowchart illustrating a method 1600 that supports transmit beam selection schemes for multiple TRPs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may prioritize a first transmission scheme among a set of transmission schemes to use for a TCI determination. The operations of 1605 may be performed according to the methods described herein. In some examples, aspects of the operations of 1605 may be performed by a prioritization component as described with reference to FIGS. 7 through 10.

At 1610, the UE may receive, from a first TRP of multiple TRPs and via a first carrier, a downlink control message that schedules a downlink signal for the UE via a second carrier. The operations of 1610 may be performed according to the methods described herein. In some examples, aspects of the operations of 1610 may be performed by a control receiver as described with reference to FIGS. 7 through 10.

At 1615, the UE may select one or more TCI states of a set of TCI states for reception of the downlink signal based on the prioritization of the first transmission scheme. The operations of 1615 may be performed according to the methods described herein. In some examples, aspects of the operations of 1615 may be performed by a TCI state selector as described with reference to FIGS. 7 through 10.

At 1620, the UE may select the one or more TCI states independent of a second transmission scheme indicated by the downlink control message. The operations of 1620 may be performed according to the methods described herein. In some examples, aspects of the operations of 1620 may be performed by a TCI state selector as described with reference to FIGS. 7 through 10.

At 1625, the UE may receive the downlink signal via the second carrier in accordance with the selected one or more TCI states. The operations of 1625 may be performed according to the methods described herein. In some examples, aspects of the operations of 1625 may be performed by a downlink signal receiver as described with reference to FIGS. 7 through 10.

Figure 17:
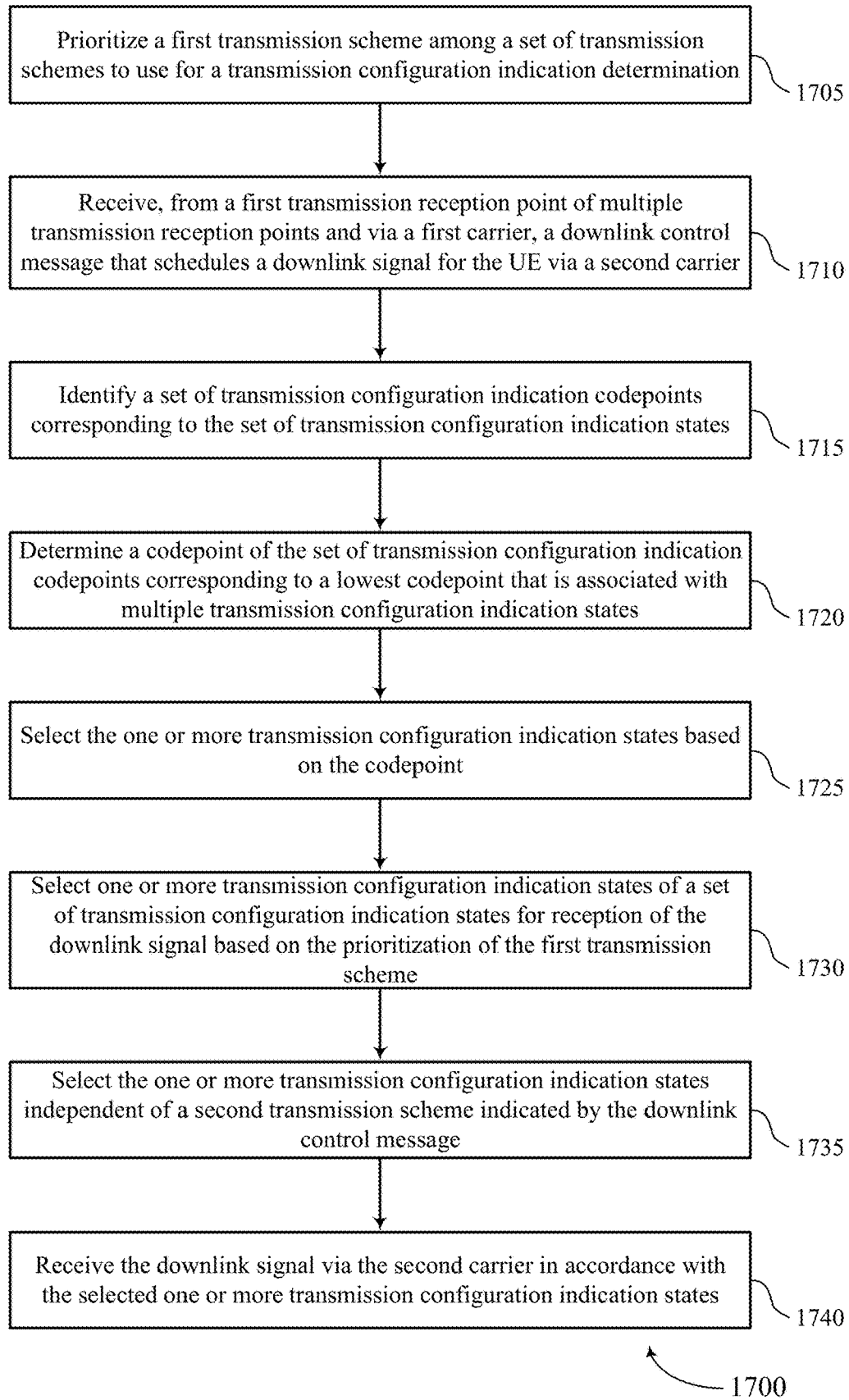

FIG. 17 shows a flowchart illustrating a method 1700 that supports transmit beam selection schemes for multiple TRPs in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1705, the UE may prioritize a first transmission scheme among a set of transmission schemes to use for a TCI determination. The operations of 1705 may be performed according to the methods described herein. In some examples, aspects of the operations of 1705 may be performed by a prioritization component as described with reference to FIGS. 7 through 10.

At 1710, the UE may receive, from a first TRP of multiple TRPs and via a first carrier, a downlink control message that schedules a downlink signal for the UE via a second carrier. The operations of 1710 may be performed according to the methods described herein. In some examples, aspects of the operations of 1710 may be performed by a control receiver as described with reference to FIGS. 7 through 10.

At 1715, the UE may identify a set of TCI codepoints corresponding to the set of TCI states. The operations of 1715 may be performed according to the methods described herein. In some examples, aspects of the operations of 1715 may be performed by a codepoint manager as described with reference to FIGS. 7 through 10.

At 1720, the UE may determine a codepoint of the set of TCI codepoints corresponding to a lowest codepoint that is associated with multiple TCI states. The operations of 1720 may be performed according to the methods described herein. In some examples, aspects of the operations of 1720 may be performed by a codepoint manager as described with reference to FIGS. 7 through 10.

At 1725, the UE may select the one or more TCI states based on the codepoint. The operations of 1725 may be performed according to the methods described herein. In some examples, aspects of the operations of 1725 may be performed by a TCI state selector as described with reference to FIGS. 7 through 10.

At 1730, the UE may select one or more TCI states of a set of TCI states for reception of the downlink signal based on the prioritization of the first transmission scheme. The operations of 1730 may be performed according to the methods described herein. In some examples, aspects of the operations of 1730 may be performed by a TCI state selector as described with reference to FIGS. 7 through 10.

At 1735, the UE may select the one or more TCI states independent of a second transmission scheme indicated by the downlink control message. The operations of 1735 may be performed according to the methods described herein. In some examples, aspects of the operations of 1735 may be performed by a TCI state selector as described with reference to FIGS. 7 through 10.

At 1740, the UE may receive the downlink signal via the second carrier in accordance with the selected one or more TCI states. The operations of 1740 may be performed according to the methods described herein. In some examples, aspects of the operations of 1740 may be performed by a downlink signal receiver as described with reference to FIGS. 7 through 10.

Figure 18:
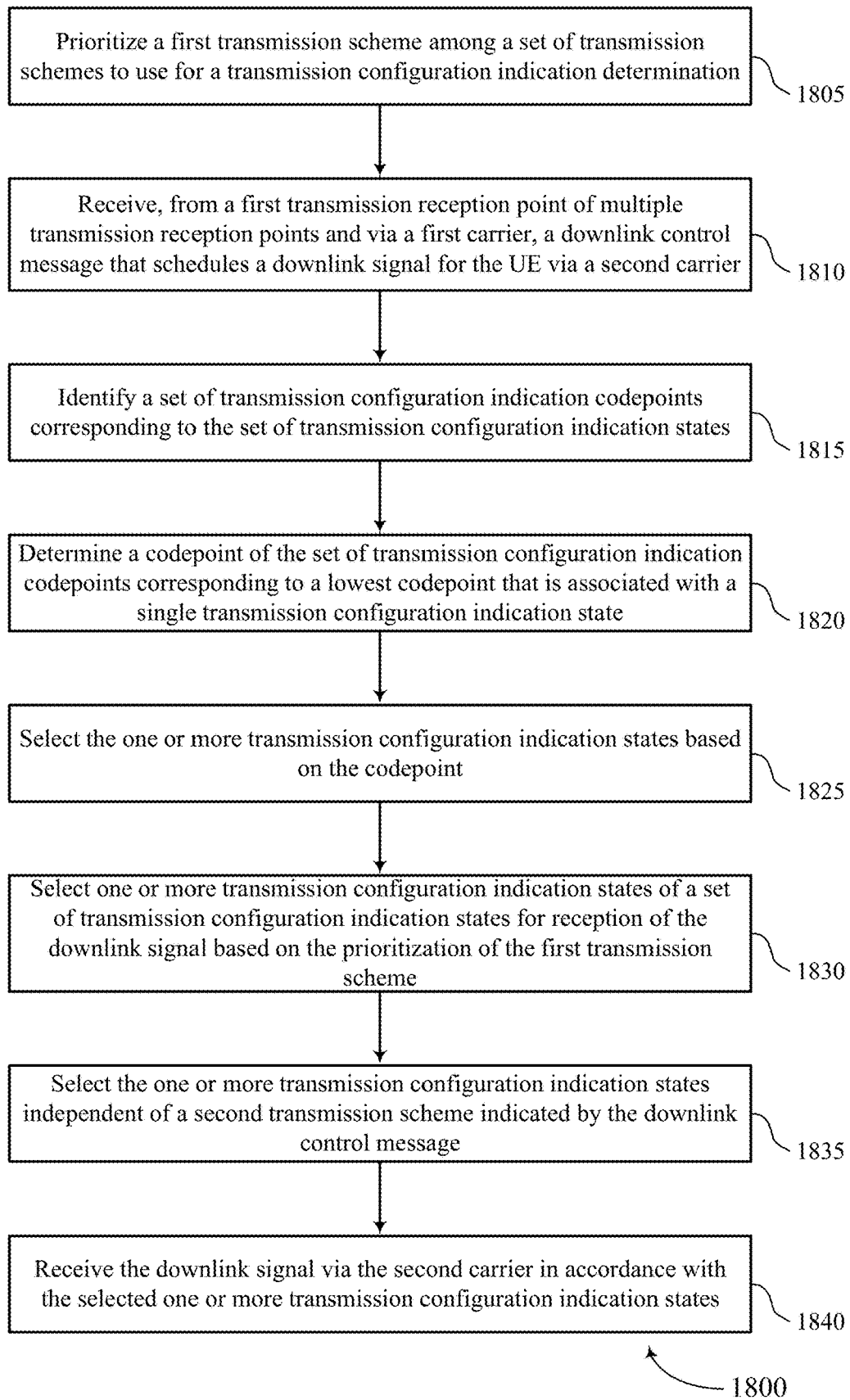

FIG. 18 shows a flowchart illustrating a method 1800 that supports transmit beam selection schemes for multiple TRPs in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may prioritize a first transmission scheme among a set of transmission schemes to use for a TCI determination. The operations of 1805 may be performed according to the methods described herein. In some examples, aspects of the operations of 1805 may be performed by a prioritization component as described with reference to FIGS. 7 through 10.

At 1810, the UE may receive, from a first TRP of multiple TRPs and via a first carrier, a downlink control message that schedules a downlink signal for the UE via a second carrier. The operations of 1810 may be performed according to the methods described herein. In some examples, aspects of the operations of 1810 may be performed by a control receiver as described with reference to FIGS. 7 through 10.

At 1815, the UE may identify a set of TCI codepoints corresponding to the set of TCI states. The operations of 1815 may be performed according to the methods described herein. In some examples, aspects of the operations of 1815 may be performed by a codepoint manager as described with reference to FIGS. 7 through 10.

At 1820, the UE may determine a codepoint of the set of TCI codepoints corresponding to a lowest codepoint that is associated with a single TCI state. The operations of 1820 may be performed according to the methods described herein. In some examples, aspects of the operations of 1820 may be performed by a codepoint manager as described with reference to FIGS. 7 through 10.

At 1825, the UE may select the one or more TCI states based on the codepoint. The operations of 1825 may be performed according to the methods described herein. In some examples, aspects of the operations of 1825 may be performed by a TCI state selector as described with reference to FIGS. 7 through 10.

At 1830, the UE may select one or more TCI states of a set of TCI states for reception of the downlink signal based on the prioritization of the first transmission scheme. The operations of 1830 may be performed according to the methods described herein. In some examples, aspects of the operations of 1830 may be performed by a TCI state selector as described with reference to FIGS. 7 through 10.

At 1835, the UE may select the one or more TCI states independent of a second transmission scheme indicated by the downlink control message. The operations of 1835 may be performed according to the methods described herein. In some examples, aspects of the operations of 1835 may be performed by a TCI state selector as described with reference to FIGS. 7 through 10.

At 1840, the UE may receive the downlink signal via the second carrier in accordance with the selected one or more TCI states. The operations of 1840 may be performed according to the methods described herein. In some examples, aspects of the operations of 1840 may be performed by a downlink signal receiver as described with reference to FIGS. 7 through 10.

Figure 19:
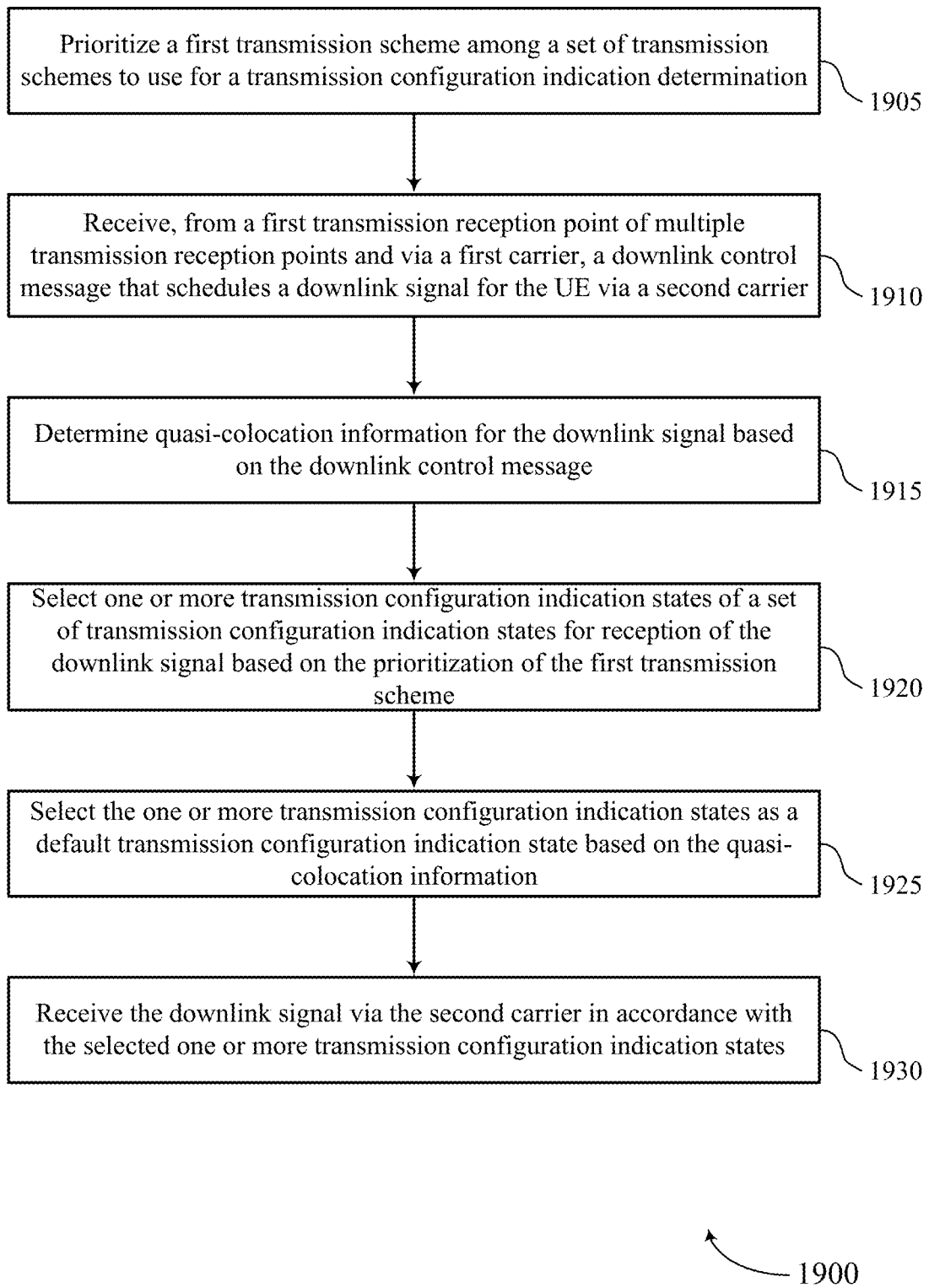

FIG. 19 shows a flowchart illustrating a method 1900 that supports transmit beam selection schemes for multiple TRPs in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1905, the UE may prioritize a first transmission scheme among a set of transmission schemes to use for a TCI determination. The operations of 1905 may be performed according to the methods described herein. In some examples, aspects of the operations of 1905 may be performed by a prioritization component as described with reference to FIGS. 7 through 10.

At 1910, the UE may receive, from a first TRP of multiple TRPs and via a first carrier, a downlink control message that schedules a downlink signal for the UE via a second carrier. The operations of 1910 may be performed according to the methods described herein. In some examples, aspects of the operations of 1910 may be performed by a control receiver as described with reference to FIGS. 7 through 10.

At 1915, the UE may determine quasi-colocation information for the downlink signal based on the downlink control message. The operations of 1915 may be performed according to the methods described herein. In some examples, aspects of the operations of 1915 may be performed by a QCL component as described with reference to FIGS. 7 through 10.

At 1920, the UE may select one or more TCI states of a set of TCI states for reception of the downlink signal based on the prioritization of the first transmission scheme. The operations of 1920 may be performed according to the methods described herein. In some examples, aspects of the operations of 1920 may be performed by a TCI state selector as described with reference to FIGS. 7 through 10.

At 1925, the UE may select the one or more TCI states as a default TCI state based on the quasi-colocation information. The operations of 1925 may be performed according to the methods described herein. In some examples, aspects of the operations of 1925 may be performed by a TCI state selector as described with reference to FIGS. 7 through 10.

At 1930, the UE may receive the downlink signal via the second carrier in accordance with the selected one or more TCI states. The operations of 1930 may be performed according to the methods described herein. In some examples, aspects of the operations of 1930 may be performed by a downlink signal receiver as described with reference to FIGS. 7 through 10.

Figure 20:
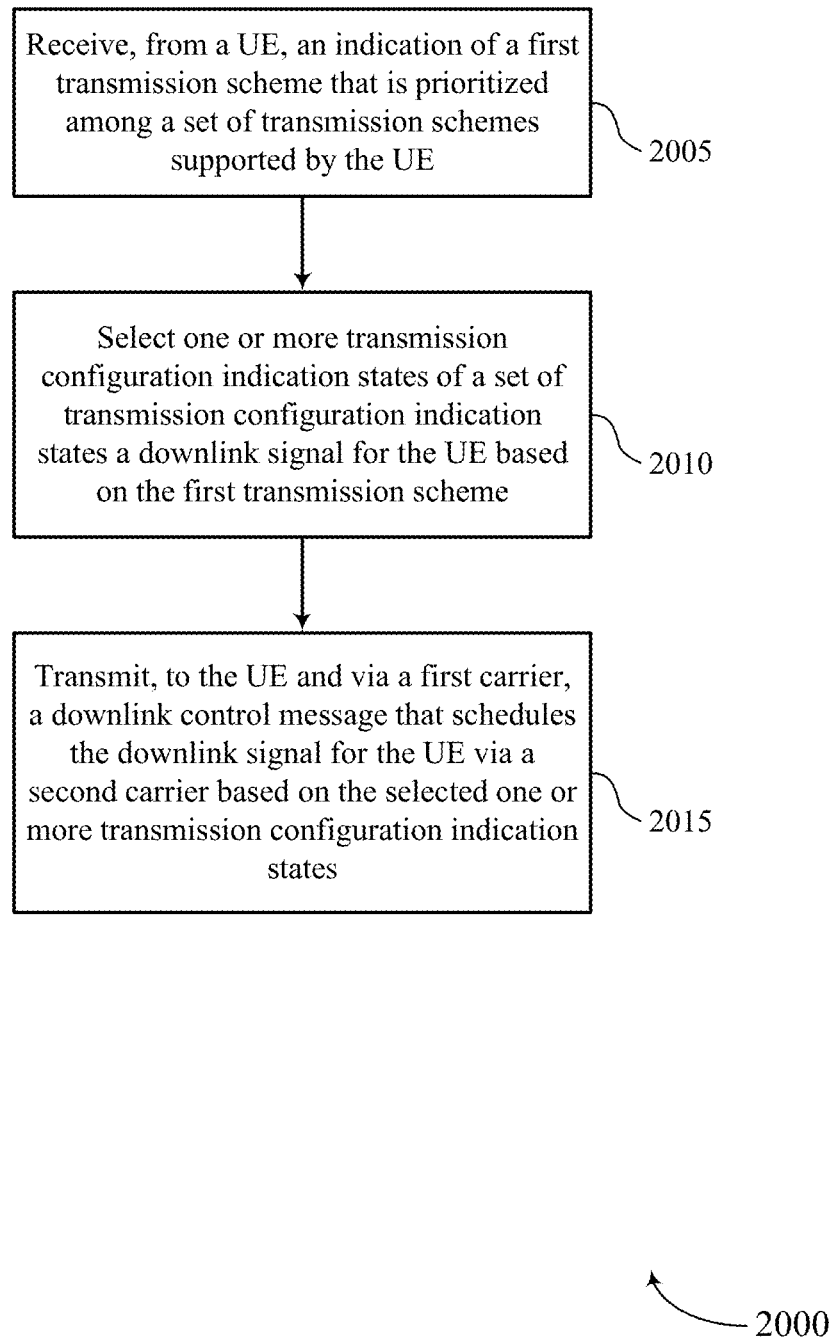

FIG. 20 shows a flowchart illustrating a method 2000 that supports transmit beam selection schemes for multiple TRPs in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2005, the base station may receive, from a UE, an indication of a first transmission scheme that is prioritized among a set of transmission schemes supported by the UE. The operations of 2005 may be performed according to the methods described herein. In some examples, aspects of the operations of 2005 may be performed by an indication receiver as described with reference to FIGS. 11 through 14.

At 2010, the base station may select one or more TCI states of a set of TCI states a downlink signal for the UE based on the first transmission scheme. The operations of 2010 may be performed according to the methods described herein. In some examples, aspects of the operations of 2010 may be performed by a selection manager as described with reference to FIGS. 11 through 14.

At 2015, the base station may transmit, to the UE and via a first carrier, a downlink control message that schedules the downlink signal for the UE via a second carrier based on the selected one or more TCI states. The operations of 2015 may be performed according to the methods described herein. In some examples, aspects of the operations of 2015 may be performed by a control transmitter as described with reference to FIGS. 11 through 14.

Figure 21:
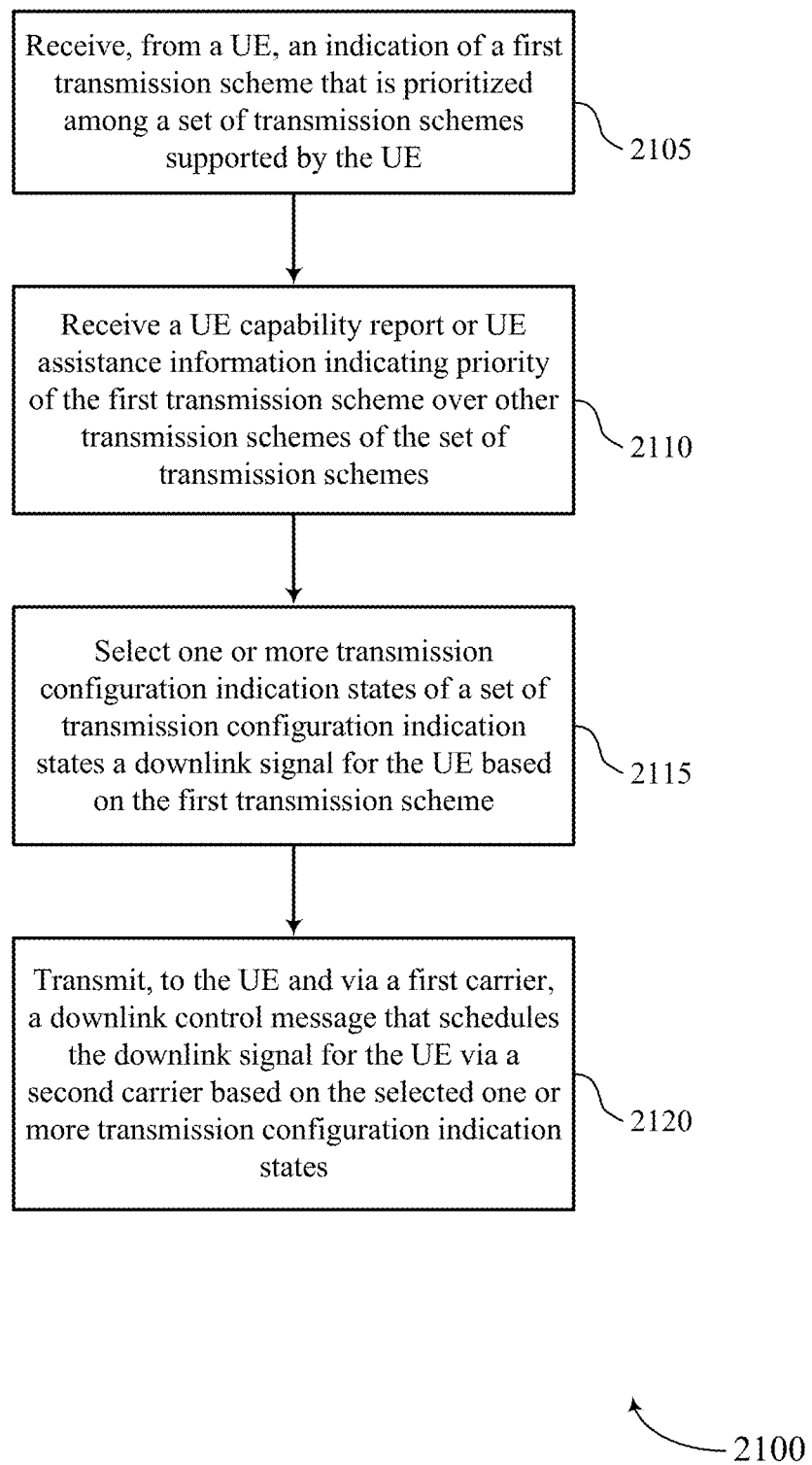

FIG. 21 shows a flowchart illustrating a method 2100 that supports transmit beam selection schemes for multiple TRPs in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2105, the base station may receive, from a UE, an indication of a first transmission scheme that is prioritized among a set of transmission schemes supported by the UE. The operations of 2105 may be performed according to the methods described herein. In some examples, aspects of the operations of 2105 may be performed by an indication receiver as described with reference to FIGS. 11 through 14.

At 2110, the base station may receive a UE capability report or UE assistance information indicating priority of the first transmission scheme over other transmission schemes of the set of transmission schemes. The operations of 2110 may be performed according to the methods described herein. In some examples, aspects of the operations of 2110 may be performed by a capability receiver as described with reference to FIGS. 11 through 14.

At 2115, the base station may select one or more TCI states of a set of TCI states a downlink signal for the UE based on the first transmission scheme. The operations of 2115 may be performed according to the methods described herein. In some examples, aspects of the operations of 2115 may be performed by a selection manager as described with reference to FIGS. 11 through 14.

At 2120, the base station may transmit, to the UE and via a first carrier, a downlink control message that schedules the downlink signal for the UE via a second carrier based on the selected one or more TCI states. The operations of 2120 may be performed according to the methods described herein. In some examples, aspects of the operations of 2120 may be performed by a control transmitter as described with reference to FIGS. 11 through 14.

Figure 22:
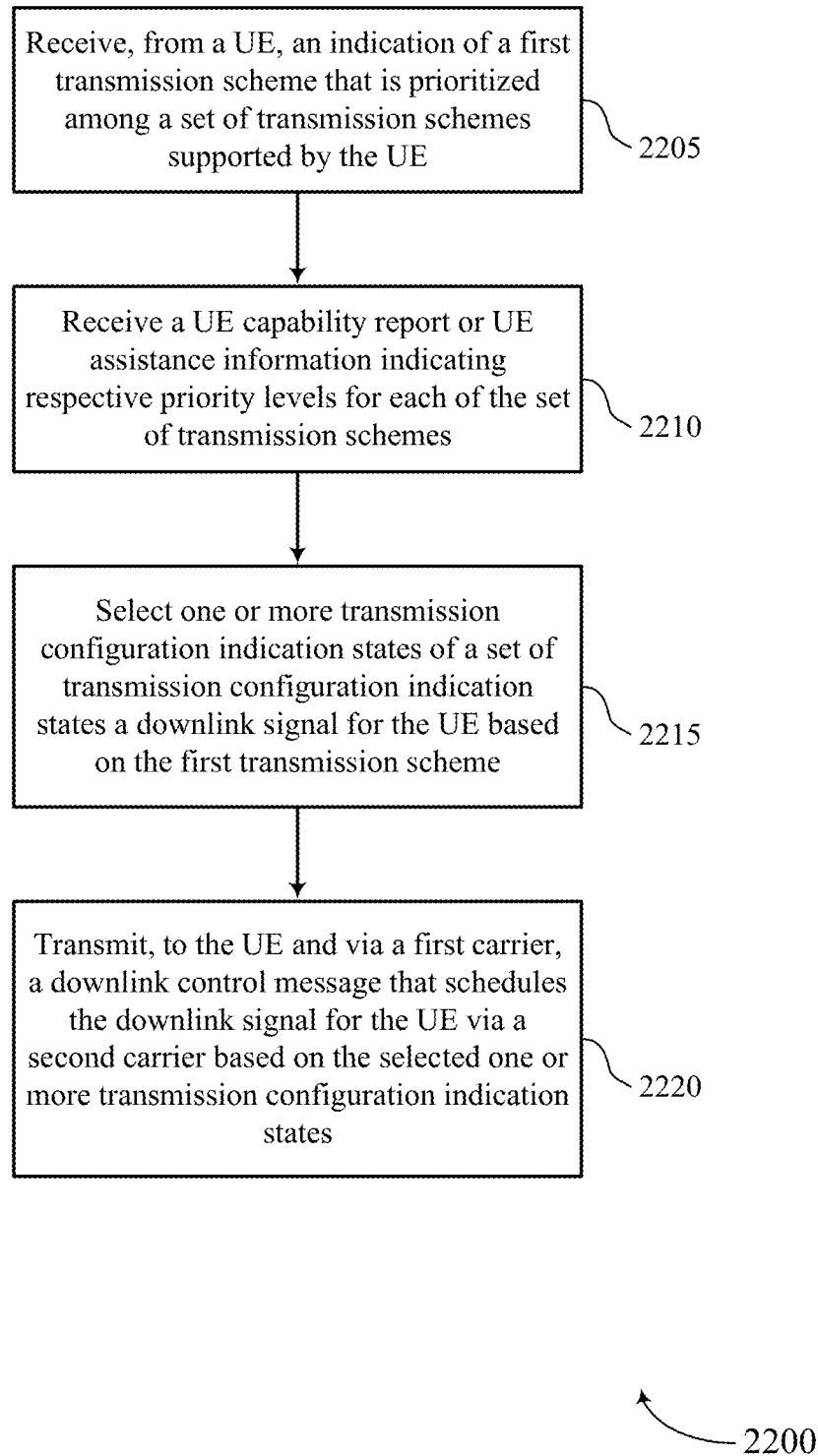

FIG. 22 shows a flowchart illustrating a method 2200 that supports transmit beam selection schemes for multiple TRPs in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2205, the base station may receive, from a UE, an indication of a first transmission scheme that is prioritized among a set of transmission schemes supported by the UE. The operations of 2205 may be performed according to the methods described herein. In some examples, aspects of the operations of 2205 may be performed by an indication receiver as described with reference to FIGS. 11 through 14.

At 2210, the base station may receive a UE capability report or UE assistance information indicating respective priority levels for each of the set of transmission schemes. The operations of 2210 may be performed according to the methods described herein. In some examples, aspects of the operations of 2210 may be performed by a capability receiver as described with reference to FIGS. 11 through 14.

At 2215, the base station may select one or more TCI states of a set of TCI states a downlink signal for the UE based on the first transmission scheme. The operations of 2215 may be performed according to the methods described herein. In some examples, aspects of the operations of 2215 may be performed by a selection manager as described with reference to FIGS. 11 through 14.

At 2220, the base station may transmit, to the UE and via a first carrier, a downlink control message that schedules the downlink signal for the UE via a second carrier based on the selected one or more TCI states. The operations of 2220 may be performed according to the methods described herein. In some examples, aspects of the operations of 2220 may be performed by a control transmitter as described with reference to FIGS. 11 through 14.

Figure 23:
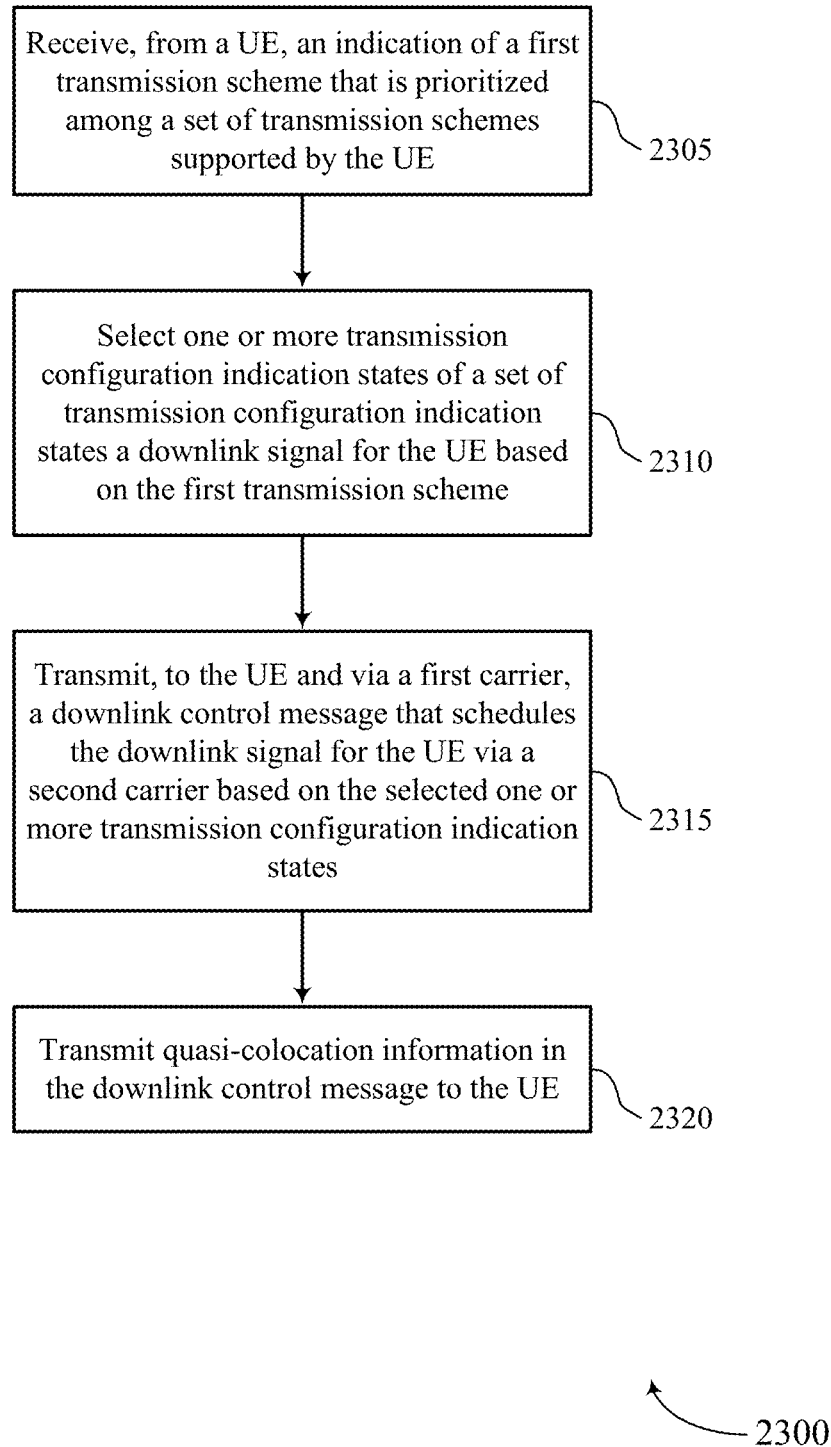

FIG. 23 shows a flowchart illustrating a method 2300 that supports transmit beam selection schemes for multiple TRPs in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2305, the base station may receive, from a UE, an indication of a first transmission scheme that is prioritized among a set of transmission schemes supported by the UE. The operations of 2305 may be performed according to the methods described herein. In some examples, aspects of the operations of 2305 may be performed by an indication receiver as described with reference to FIGS. 11 through 14.

At 2310, the base station may select one or more TCI states of a set of TCI states a downlink signal for the UE based on the first transmission scheme. The operations of 2310 may be performed according to the methods described herein. In some examples, aspects of the operations of 2310 may be performed by a selection manager as described with reference to FIGS. 11 through 14.

At 2315, the base station may transmit, to the UE and via a first carrier, a downlink control message that schedules the downlink signal for the UE via a second carrier based on the selected one or more TCI states. The operations of 2315 may be performed according to the methods described herein. In some examples, aspects of the operations of 2315 may be performed by a control transmitter as described with reference to FIGS. 11 through 14.

At 2320, the base station may transmit quasi-colocation information in the downlink control message to the UE. The operations of 2320 may be performed according to the methods described herein. In some examples, aspects of the operations of 2320 may be performed by a QCL transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, to a first transmission reception point (TRP) of multiple TRPs, a UE capability report or a UE assistance information indicating respective priority levels for each transmission scheme of a plurality of transmission schemes, wherein the plurality of transmission schemes includes at least a single-TRP transmission scheme, a multi-TRP transmission scheme, and a single frequency network transmission scheme;
    transmitting, to the first TRP, information indicating a prioritization of a first transmission scheme over other transmission schemes of the plurality of transmission schemes supported at the UE;
    receiving, from the first TRP and via a first carrier, a downlink control message that schedules a downlink signal for the UE via a second carrier;
    selecting one or more transmission configuration indication states of a set of transmission configuration indication states for reception of the downlink signal based at least in part on the prioritization of the first transmission scheme; and
    receiving the downlink signal via the second carrier in accordance with the selected one or more transmission configuration indication states and the information indicating the prioritization of the first transmission scheme.

2. The method of claim 1, wherein selecting the one or more transmission configuration indication states further comprises:
    selecting the one or more transmission configuration indication states independent of a second transmission scheme indicated by the downlink control message.

3. The method of claim 2, wherein the first transmission scheme is the multi-TRP transmission scheme of the plurality of transmission schemes, the method further comprising:
  identifying a set of transmission configuration indication codepoints corresponding to the set of transmission configuration indication states;
  determining a codepoint of the set of transmission configuration indication codepoints corresponding to a lowest codepoint that is associated with multiple transmission configuration indication states; and
  selecting the one or more transmission configuration indication states based at least in part on the codepoint.

4. The method of claim 2, wherein the first transmission scheme is the single-TRP transmission scheme of the plurality of transmission schemes, the method further comprising:
  identifying a set of transmission configuration indication codepoints corresponding to the set of transmission configuration indication states;
  determining a codepoint of the set of transmission configuration indication codepoints corresponding to a lowest codepoint that is associated with a single transmission configuration indication state; and
  selecting the one or more transmission configuration indication states based at least in part on the codepoint.

5. The method of claim 1, further comprising:
  determining quasi-colocation information for the downlink signal based at least in part on the downlink control message; and
  selecting the one or more transmission configuration indication states as a default transmission configuration indication state based at least in part on the quasi-colocation information.

6. The method of claim 1, further comprising:
  determining one or more transmit beams for transmission of the downlink signal based at least in part on the selected one or more transmission configuration indication states; and
  receiving the downlink signal based at least in part on the one or more transmit beams.

7. The method of claim 1, further comprising:
  determining a beam switch timing interval based at least in part on a second transmission scheme indicated by the downlink control message, wherein the one or more transmission configuration indication states are selected based at least in part on the beam switch timing interval.

8. The method of claim 7, wherein selecting the one or more transmission configuration indication states further comprises:
  determining default quasi-colocation information corresponding to the selected one or more transmission configuration indication states based at least in part on the downlink signal being scheduled within the beam switch timing interval.

9. The method of claim 7, wherein selecting the one or more transmission configuration indication states further comprises:
  determining quasi-colocation information corresponding to the selected one or more transmission configuration indication states based at least in part on the downlink control message.

10. The method of claim 1, further comprising:
  determining the first transmission scheme to be a cross carrier scheme based at least in part on the second carrier being different than the first carrier.

11. The method of claim 1, further comprising:
  determining the first transmission scheme to be a same carrier scheme based at least in part on the second carrier being a same carrier as the first carrier.

12. The method of claim 1, further comprising:
  determining the first transmission scheme to be the single-TRP transmission scheme of the plurality of transmission schemes based at least in part on the downlink signal being scheduled for transmission by the first TRP.

13. The method of claim 1, further comprising:
  determining the first transmission scheme to be the multi-TRP transmission scheme of the plurality of transmission schemes based at least in part on the downlink signal being scheduled for transmission by a second TRP of the multiple TRPs.

14. A method for wireless communications at a transmission reception point (TRP), comprising:
  receiving, from a user equipment (UE), a UE capability report or a UE assistance information indicating respective priority levels for each transmission scheme of a plurality of transmission schemes, wherein the plurality of transmission schemes include at least a single-TRP transmission scheme, a multi-TRP transmission scheme, and a single frequency network transmission scheme;
  receiving, from the UE, an indication of a first transmission scheme that is prioritized among the plurality of transmission schemes supported by the UE;
  selecting one or more transmission configuration indication states of a set of transmission configuration indication states for a downlink signal to the UE based at least in part on the first transmission scheme; and
  transmitting, to the UE and via a first carrier, a downlink control message that schedules the downlink signal for the UE via a second carrier based at least in part on the selected one or more transmission configuration indication states and the first transmission scheme being prioritized among the plurality of transmission schemes.

15. The method of claim 14, further comprising:
  determining one or more transmit beams used for transmission of the downlink signal based at least in part on the selected one or more transmission configuration indication states; and
  transmitting the downlink signal based at least in part on the one or more transmit beams.

16. The method of claim 14, further comprising:
  determining a beam switch timing interval based at least in part on the downlink control message, wherein the one or more transmission configuration indication states are selected based at least in part on the beam switch timing interval.

17. The method of claim 14, further comprising:
  transmitting quasi-colocation information in the downlink control message to the UE.

18. An apparatus for wireless communications at a user equipment (UE), comprising:
  one or more processors,
  at least one memory coupled with the one or more processors; and
  instructions stored in the at least one memory and executable by the one or more processors to cause the apparatus to:
    transmit, to a first transmission reception point (TRP) of multiple TRPs, a UE capability report or a UE assistance information indicating respective priority levels for each transmission scheme of a plurality of transmission schemes, wherein the plurality of transmission schemes include at least a single-TRP transmission scheme, a multi-TRP transmission scheme, and a single frequency network transmission scheme;

transmit, to the first TRP, information indicating a prioritization of a first transmission scheme over other transmission schemes of the plurality of transmission schemes supported at the UE;

receive, from the first TRP and via a first carrier, a downlink control message that schedules a downlink signal for the UE via a second carrier;

select one or more transmission configuration indication states of a set of transmission configuration indication states for reception of the downlink signal based at least in part on the prioritization of the first transmission scheme; and receive the downlink signal via the second carrier in accordance with the selected one or more transmission configuration indication states and the information indicating the prioritization of the first transmission scheme.

19. The apparatus of claim 18, wherein the instructions stored in the at least one memory are further executable by the one or more processors to cause the apparatus to:

select the one or more transmission configuration indication states independent of a second transmission scheme indicated by the downlink control message.

20. The apparatus of claim 18, wherein the instructions stored in the at least one memory are further executable by the one or more processors to cause the apparatus to:

determine quasi-colocation information for the downlink signal based at least in part on the downlink control message; and select the one or more transmission configuration indication states as a default transmission configuration indication state based at least in part on the quasi-colocation information.

21. An apparatus for wireless communications at a transmission reception point (TRP), comprising:
one or more processors,
at least one memory coupled with the one or more processors; and
instructions stored in the at least one memory and executable by the one or more processors to cause the apparatus to:
receive, from a user equipment (UE), a UE capability report or a UE assistance information indicating respective priority levels for each transmission scheme of a plurality of transmission schemes, wherein the plurality of transmission schemes include at least a single-TRP transmission scheme, a multi-TRP transmission scheme, and a single frequency network transmission scheme;
receive, from the UE, an indication of a first transmission scheme that is prioritized among the plurality of transmission schemes supported by the UE;
select one or more transmission configuration indication states of a set of transmission configuration indication states for a downlink signal to the UE based at least in part on the first transmission scheme; and
transmit, to the UE and via a first carrier, a downlink control message that schedules the downlink signal for the UE via a second carrier based at least in part on the selected one or more transmission configuration indication states and the first transmission scheme being prioritized among the plurality of transmission schemes.

* * * * *